(12) United States Patent
Deahl et al.

(10) Patent No.: US 9,969,283 B2
(45) Date of Patent: May 15, 2018

(54) BATTERY CHANGING SYSTEM AND METHOD

(71) Applicant: General Electric Company, Schenectady, NY (US)

(72) Inventors: Paul Deahl, Glen Lyn, VA (US); Derek Brumfield, Glen Lyn, VA (US)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 14/478,232

(22) Filed: Sep. 5, 2014

(65) Prior Publication Data

US 2015/0071747 A1 Mar. 12, 2015

Related U.S. Application Data

(60) Provisional application No. 61/876,216, filed on Sep. 10, 2013.

(51) Int. Cl.
*B60L 11/18* (2006.01)
*E21F 13/02* (2006.01)
(Continued)

(52) U.S. Cl.
CPC ............ *B60L 11/1822* (2013.01); *B60K 1/04* (2013.01); *B60L 11/1879* (2013.01);
(Continued)

(58) Field of Classification Search
CPC ......... E21F 13/025; E21F 13/06; B60L 11/18; B60L 11/1822; B60L 11/1877;
(Continued)

(56) References Cited

U.S. PATENT DOCUMENTS 1,256,214 A * 2/1918 Eaton ............... B60L 11/18
105/175.1
3,236,401 A 2/1966 Wagner
(Continued)

FOREIGN PATENT DOCUMENTS

CN 201272278 Y 7/2009
CN 201296937 Y 8/2009
(Continued)

OTHER PUBLICATIONS

RDH Mining Equipment; Muckmaster 300EB Evolution; Battery powered, 2 to 3 cubic yard capacity LHD; 3 pgs.
(Continued)

*Primary Examiner* — Glenn F Myers
(74) *Attorney, Agent, or Firm* — GE Global Patent Operation; John A. Kramer

(57) ABSTRACT

A battery changing system includes a grasping assembly and an actuation assembly. The grasping assembly is configured to be disposed onboard a vehicle and to engage a battery box having one or more batteries disposed therein. The actuation assembly is configured to move the grasping assembly away from the vehicle toward the battery box. The actuation assembly also is configured to move the grasping assembly into engagement with a securing assembly of the battery box. The actuation assembly is configured to move the grasping assembly back toward the vehicle while the grasping assembly engages the securing assembly of the battery box to lift the battery box onto the vehicle.

20 Claims, 18 Drawing Sheets

(51) Int. Cl.
*B60K 1/04* (2006.01)
*B60S 5/06* (2006.01)

(52) U.S. Cl.
CPC .... *E21F 13/025* (2013.01); *B60K 2001/0416* (2013.01); *B60K 2001/0477* (2013.01); *B60K 2001/0494* (2013.01); *B60L 11/1877* (2013.01); *B60L 2200/40* (2013.01); *B60S 5/06* (2013.01); *Y02P 90/60* (2015.11); *Y02T 10/7005* (2013.01); *Y02T 10/705* (2013.01); *Y02T 10/7072* (2013.01); *Y02T 90/124* (2013.01); *Y02T 90/14* (2013.01)

(58) Field of Classification Search
CPC ............ B60L 11/1809; B60L 11/1879; B60K 2001/0416; B60K 2001/0477; B60K 2001/0494; B60K 2001/0488; B60K 2001/0444; B60K 2001/0455; B60S 5/06; B61D 11/02
See application file for complete search history.

(56) References Cited

U.S. PATENT DOCUMENTS

| | | | |
|---|---|---|---|
| 3,499,566 | A | 3/1970 | Wagner |
| 4,395,193 | A | 7/1983 | Christensen et al. |
| 4,890,684 | A | 1/1990 | Simmons |
| 5,088,214 | A | 2/1992 | Jones |
| 5,163,537 | A * | 11/1992 | Radev ............... B60K 1/04 180/65.1 |
| 5,226,777 | A | 7/1993 | Radev |
| 5,399,061 | A | 3/1995 | Grumblatt |
| 5,598,083 | A | 1/1997 | Gaskins |
| 5,664,932 | A * | 9/1997 | Clonch ............. B60L 11/1822 180/68.5 |
| 5,820,331 | A | 10/1998 | Odell |
| 5,855,467 | A * | 1/1999 | Clonch ............. B60L 11/1822 180/68.5 |
| 5,879,125 | A | 3/1999 | Odell |
| 6,912,804 | B2 | 7/2005 | Charles |
| 7,059,422 | B2 | 6/2006 | Burgin |
| 7,993,091 | B2 | 8/2011 | Osanai et al. |
| 2003/0154566 | A1 | 8/2003 | Gallea et al. |
| 2005/0121241 | A1 | 6/2005 | Shorney et al. |
| 2008/0092412 | A1 | 4/2008 | McClanahan et al. |
| 2012/0018235 | A1 * | 1/2012 | O'Quinn ............... B60K 1/04 180/65.1 |
| 2012/0205893 | A1 | 8/2012 | Singh |
| 2013/0031776 | A1 | 2/2013 | Escande et al. |
| 2013/0220714 | A1 * | 8/2013 | Rudinec ............... F42D 1/10 180/65.1 |
| 2013/0236758 | A1 * | 9/2013 | Deel ............... H01M 2/1077 429/99 |

FOREIGN PATENT DOCUMENTS

| | | |
|---|---|---|
| CN | 201650294 U | 11/2010 |
| CN | 202200981 U | 4/2012 |
| CN | 102791542 A | 11/2012 |
| EP | 213886 A2 | 3/1987 |
| EP | 552027 A1 | 7/1993 |
| EP | 0741060 A2 | 11/1996 |
| EP | 1045074 A2 | 10/2000 |
| EP | 1288505 A1 | 3/2003 |
| EP | 1924981 A2 | 5/2008 |
| EP | 2535465 A2 | 12/2012 |
| JP | 0826014 A | 1/1996 |
| JP | 2013503076 A | 1/2013 |
| KR | 19980064912 U | 11/1998 |
| KR | 20110090730 A | 8/2011 |
| WO | 8301973 A1 | 6/1983 |
| WO | 8501484 A1 | 4/1985 |
| WO | 8503320 A1 | 8/1985 |
| WO | 9108121 A1 | 6/1991 |
| WO | 9108939 A1 | 6/1991 |
| WO | 9301365 A1 | 1/1993 |
| WO | 9304887 A1 | 3/1993 |
| WO | 9420766 A1 | 9/1994 |
| WO | 9533896 A1 | 12/1995 |
| WO | 9923316 A1 | 5/1999 |
| WO | 9936231 A1 | 7/1999 |
| WO | 9936670 A1 | 7/1999 |
| WO | 9936671 A1 | 7/1999 |
| WO | 9936672 A1 | 7/1999 |
| WO | 9936673 A1 | 7/1999 |
| WO | 9954158 A1 | 10/1999 |
| WO | 9966135 A1 | 12/1999 |
| WO | 0107976 A1 | 2/2001 |
| WO | 0222388 A1 | 3/2002 |
| WO | 0223296 A1 | 3/2002 |
| WO | 02059428 A1 | 8/2002 |
| WO | 02061515 A2 | 8/2002 |
| WO | 03062541 A1 | 7/2003 |
| WO | 03069561 A2 | 8/2003 |
| WO | 2004029368 A1 | 4/2004 |
| WO | 2004106304 A2 | 12/2004 |
| WO | 2005002626 A2 | 1/2005 |
| WO | 05045142 A1 | 5/2005 |
| WO | 05117539 A2 | 12/2005 |
| WO | 2006076776 A1 | 7/2006 |
| WO | 2007012199 A2 | 2/2007 |
| WO | 2007050149 A1 | 5/2007 |
| WO | 2007129946 A1 | 11/2007 |
| WO | 2007129947 A1 | 11/2007 |
| WO | 2007145582 A1 | 12/2007 |
| WO | 2008089509 A1 | 7/2008 |
| WO | 2009004343 A2 | 1/2009 |
| WO | 2009051546 A1 | 4/2009 |
| WO | 2009108089 A1 | 9/2009 |
| WO | 2009128815 A1 | 10/2009 |
| WO | 2009145694 A1 | 12/2009 |
| WO | 2009145695 A1 | 12/2009 |
| WO | 2010057277 A1 | 5/2010 |
| WO | 2010111734 A1 | 10/2010 |
| WO | 2010132014 A1 | 11/2010 |
| WO | 2011062545 A1 | 5/2011 |
| WO | 2011109050 A2 | 9/2011 |
| WO | 2011127526 A1 | 10/2011 |
| WO | 7900802 | 1/2012 |
| WO | 2012006559 A1 | 1/2012 |
| WO | 2012006562 A1 | 1/2012 |
| WO | 2012012240 A2 | 1/2012 |
| WO | 2012061539 A2 | 5/2012 |
| WO | 2012061888 A1 | 5/2012 |
| WO | 2012068063 A2 | 5/2012 |
| WO | 2012074655 A2 | 6/2012 |

OTHER PUBLICATIONS http://www.sudburyminingsolutions.com/rdh-introduces-battery-powered-lhd.html; RDH introduces battery-powered LHD; Sudbury Mining Solutions; 3 pgs.

A PCT Search Report and Written Opinion issued in connection with corresponding Application No PCT/US2014/054498 dated Dec. 5, 2014.

Unofficial English Translation of Japanese Search Report issued in connection with corresponding JP Application No. 2016540456 dated Jan. 31, 2017.

Unofficial English Translation of Japanese Office Action issued in connection with corresponding JP Application No. 2016540456 dated Mar. 14, 2017.

Unofficial English translation of Chinese Office Action issued in connection with corresponding CN Application No. 201480049932.3 dated Feb. 4, 2017.

* cited by examiner

BATTERY CHANGING SYSTEM AND METHOD

CROSS-REFERENCE TO RELATED APPLICATIONS

This application claims priority to U.S. Provisional Application Ser. No. 61/876,216, which was filed on 10 Sep. 2013, is titled "Battery Powered OHV With Onboard Battery Changing System And Bucket," and the entire disclosure of which is incorporated herein by reference.

FIELD

The subject matter described herein relates to electric powered systems, such as electrically powered vehicles.

BACKGROUND

Mining vehicles utilized in underground mining operations are adapted to accommodate the tight confines of the environment in which the vehicles operate. Narrow passageways, tight turns, low roofs, and small staging or depot areas give rise to vehicles which have low profiles, either shorter wheel bases or articulated frames, and heavily re-enforced operator cages.

Propulsion underground can be accomplished through the use of diesel or electric motors, though battery-driven electric motors provide advantages by reducing emissions and plug or hose residues, as well as reducing the instances of combustion-related accidents. Electric motors are powered by batteries of various chemistry types, and tend to be comprised of cells which are heavy and not easily maneuvered.

In underground mining operations, there are distinct advantages to powering vehicles and related equipment with batteries. These advantages include: reduction of emissions; relative safety; and reduction in combustion-related accidents. As with typical household battery uses, after a certain period of time there will be a need to replace the battery. Battery replacement can be facilitated by being able to drop the battery at a designated staging area and mounting a replacement.

Cells make up the individual batteries. In turn, the batteries are housed in battery boxes which provide a certain ruggedized protection to the batteries while the batteries operate in the mining environment. For those batteries that have microprocessors which monitor battery data or performance routines, it may be required that all, or a portion of, the battery be housed in an explosion proof box. The battery boxes, when mounted to the mining vehicle, are supported by trays or compartments. Replacement of the batteries is neither efficient nor easy. Due to the size and/or weight of the batteries, combined with the tight confines inside the mine, changing batteries in a vehicle can be problematic and time-consuming.

Additionally, the surfaces over which vehicles move during mining operations can be undulating and rough. Travel over these surfaces can cause abrupt shifts or other jarring actions to the batteries being carried by and/or powering the vehicles. These shifts or jarring actions can cause the batteries to become dislodged from the vehicles, which poses significant safety risks and/or ceases supply of electric power to the vehicles.

Some currently available underground mining battery-powered vehicles do not have onboard battery changing systems. Swapping batteries in these machines requires the use of a hoist or other lifting equipment. This causes more machine downtime during the required battery charging or swapping cycles and additional equipment to maintain. Another problem with requiring external lifting rigging for battery removal is that this equipment must be moved as the active mine face advances to keep the battery changing area near the working area.

Using a battery changing system as designed for use on mining scoop vehicles could cause additional problems. Hard rock mines typically have narrower hallway widths than coal mines. Because the vehicle must be able to operate in the confined space of these mines, the overall machine dimensions are limited. The confined spaces of the mine also cause problems when unloading material from the bucket. Therefore, an ejector blade is used to remove material. The problem with other known designs is that the hydraulic cylinder(s) used to operate the ejector blade are difficult to extract for replacement or servicing. Also, arrangement of the cylinder tends to not to reduce the force on the ejector as more force is needed to move the blade at the beginning of the cylinder stroke because the bucket is full of material.

BRIEF DESCRIPTION

In one embodiment, a system (e.g., a battery changing system) includes a grasping assembly and an actuation assembly. The grasping assembly is configured to be disposed onboard a vehicle and to engage a battery box having one or more batteries disposed therein. The actuation assembly is configured to move the grasping assembly away from the vehicle toward the battery box. The actuation assembly also is configured to move the grasping assembly into engagement with a securing assembly of the battery box. The actuation assembly is configured to move the grasping assembly back toward the vehicle while the grasping assembly engages the securing assembly of the battery box to lift the battery box onto the vehicle.

In another embodiment, a system (e.g., a battery changing system) includes one or more extendable devices and a grasping assembly. The one or more extendable devices are configured to be disposed onboard a mining vehicle and to change length. The grasping assembly is configured to be disposed onboard the mining vehicle and to be coupled with the one or more extendable devices. The grasping assembly includes one or more protrusions configured to engage a battery box disposed off-board of the mining vehicle. The one or more extendable devices are configured to increase in length to extend the grasping assembly away from the vehicle and to lower the grasping assembly below at least a portion of the battery box. The one or more extendable devices also can be configured to decrease in length to cause the one or more protrusions of the grasping assembly to engage the battery box, to lift the battery box, and to move the battery box onboard the mining vehicle.

In one embodiment, a vehicle (e.g., a mining vehicle) includes a vehicle frame, a haulage assembly, and a battery changing system. The vehicle frame includes at least first and second sub-frame assemblies connected with each other. The haulage assembly can be coupled with the first sub-frame assembly and configured to pick up and transport mined material. The battery changing system can be coupled with the second sub-frame assembly and configured to extend from the vehicle frame and lower to a battery box comprising one or more batteries disposed off-board the vehicle frame. The battery changing system also can be configured to grasp the battery box and lift the battery box onto the vehicle frame.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The subject matter described herein relates to systems and methods for efficiently and quickly exchanging a battery mounted on an off-highway vehicle, such as a load-haul-dump (hereinafter "LHD") type vehicle for use in underground mines. The systems can include apparatuses for lifting a battery holder, or box containing an electric battery, from ground level (e.g., the surface on which the vehicle is located) to an elevated position so as to transport the battery holder into operative engagement with the vehicle (e.g., connected or interconnected with the vehicle in order to power the vehicle and/or be conveyed by the vehicle to another location).

In order to lift and/or replace the battery of a vehicle, battery changing systems and methods are described that provide for more efficient lift points than currently known changing systems, improved stability of a battery box or tray that supports and/or encloses battery cells, and ease of "drop and replace" movement in restricted space, such as in a mine. Additionally, the vehicle may include a bucket with an easily accessible ejector blade mechanism for ease of service.

Some mining vehicles, such as scoops, may have limited lift capability, but can provide advantages through the ability to move equipment between locations in and/or around a mine. Scoops can move tailings, perform clean-up operations, utilize sprays to provide dust control, or, using scoop mounted facilities, can act as mobile service bays. LHDs, on the other hand, can have a mounted bucket that can lift up and dump, as well as remain level for service use. While the scoops may be unable to lift up and/or dump materials in locations above the scoops, LHDs may be able to lift materials in buckets of the LHDs up above the LHDs and/or dump the materials from above the LHDs. The efficiency of the buckets of these vehicles can be impaired when the materials within the bucket are not easily cleared or dumped. In one aspect, the vehicles may include ejector blades that, when engaged, scrape the bucket to clear the bucket of material for continued use.

Figure 1:
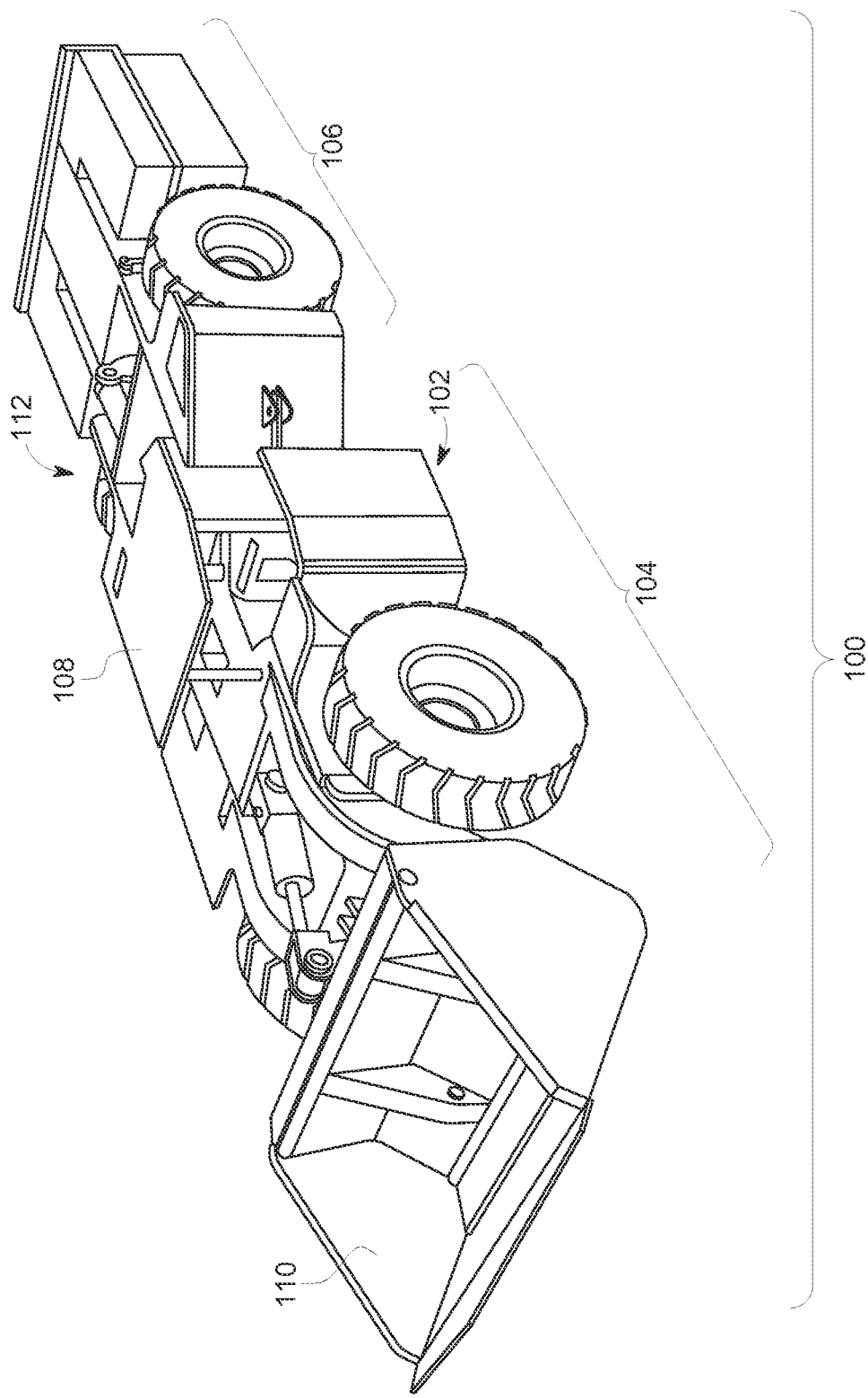
FIG. 1 is a perspective view of a vehicle according to one embodiment.

FIG. 1 is a perspective view of a vehicle 100 according to one embodiment. The vehicle 100 can represent a battery-powered mining vehicle, such as a LHD vehicle. Alternatively, the vehicle 100 can represent another type of vehicle. The vehicle 100 has an articulated frame 102 comprising, at least, a first sub-frame assembly 104 and a second sub-frame assembly 106. The sub-frame assemblies 104, 106 are joined in such a way as to allow for articulation of the vehicle 100 as the vehicle 100 maneuvers in confined spaces having tight turns. Either sub-frame assembly 104, 106 could be used to support an operator station 108 having a control module for maintaining control of the movement and operation of the vehicle 100. The LHD further comprises a haulage assembly 110 mounted on the first sub-frame assembly 104, and a battery lift assembly 112 mounted on the second sub-frame assembly 106.

Figure 2:
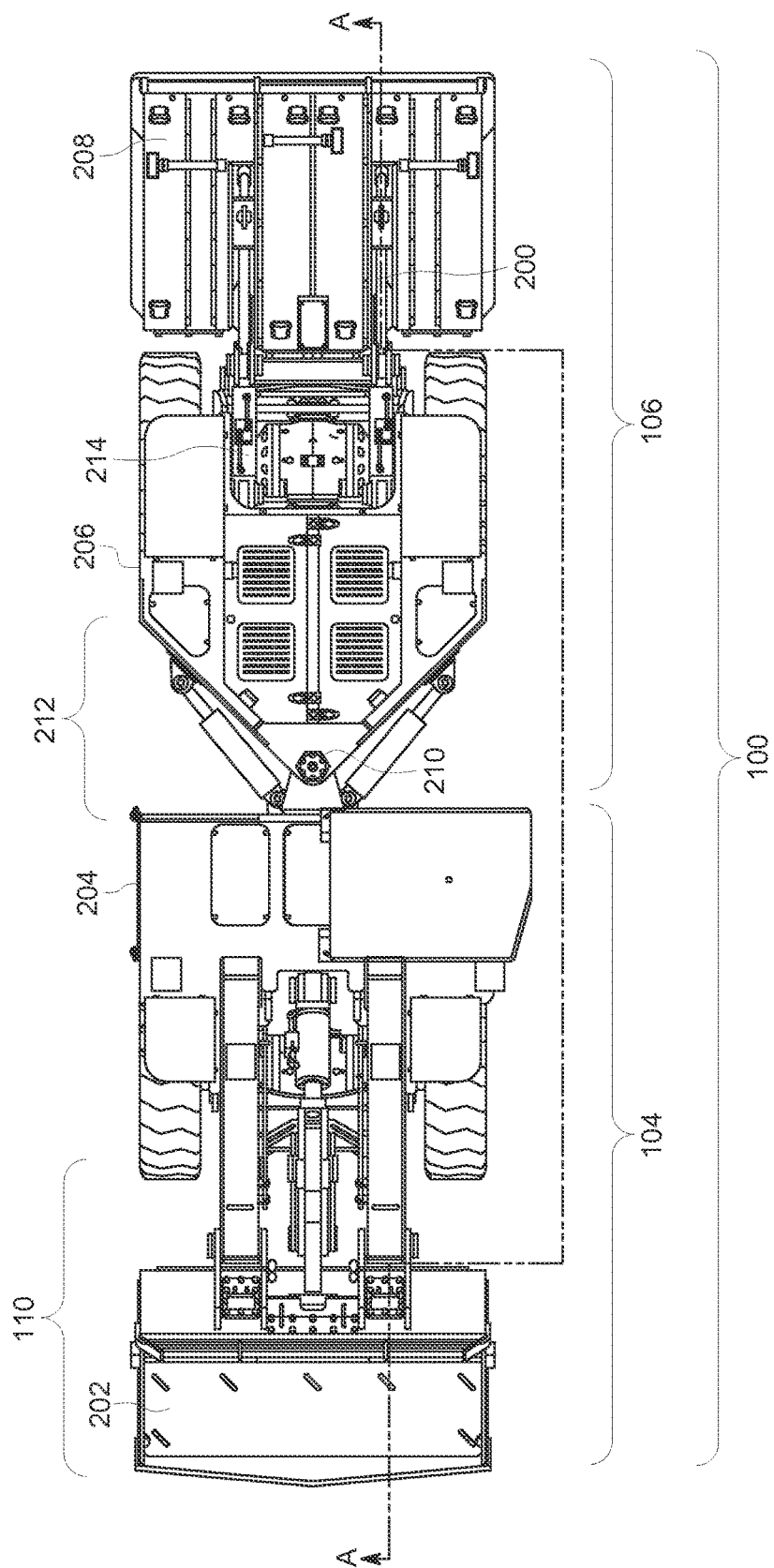
FIG. 2 illustrates a top view of the vehicle shown in FIG. 1.
Figure 3:
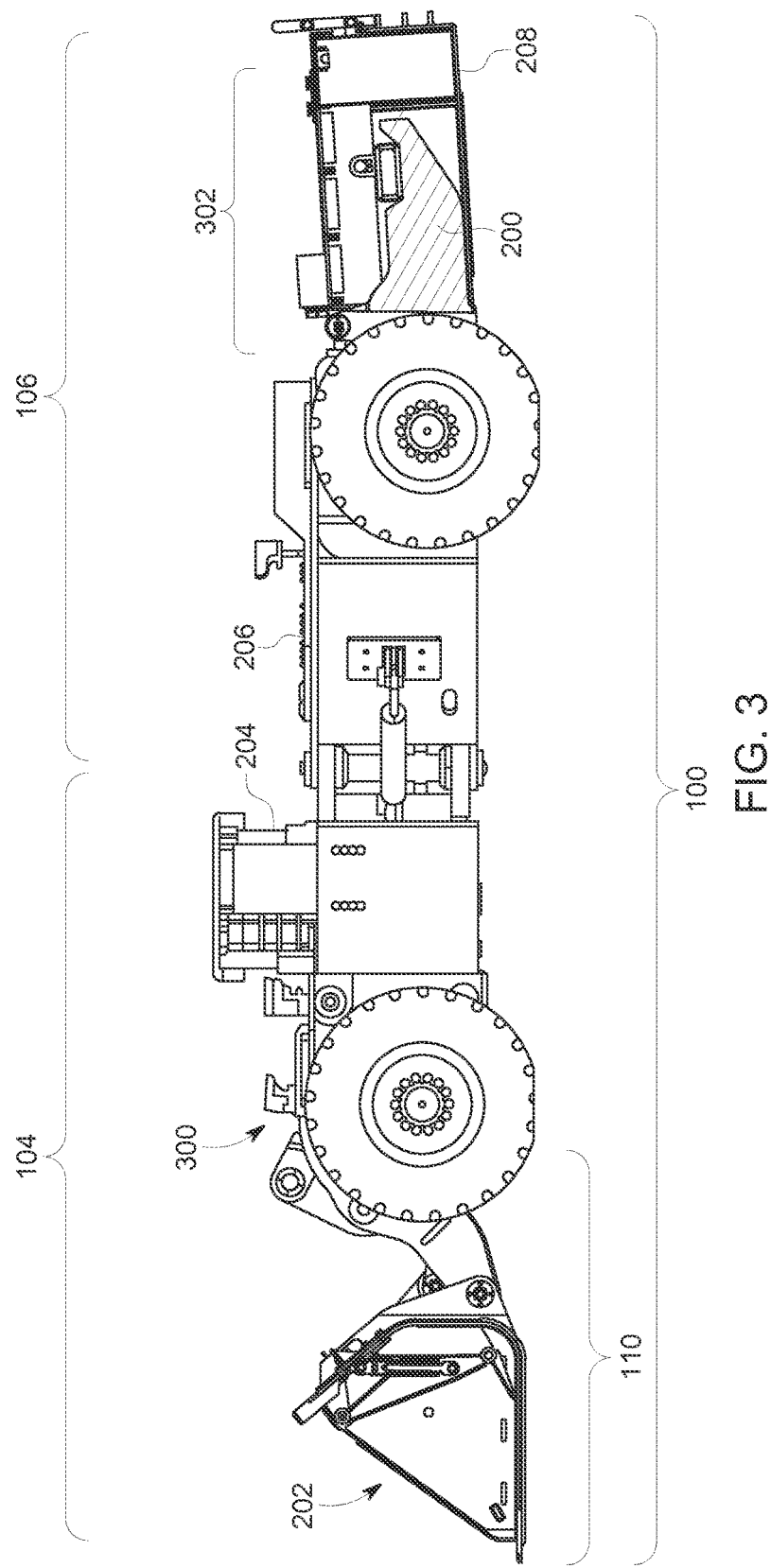
FIG. 3 illustrates a side, partial cross-sectional view of the vehicle along line A-A shown in FIG. 2.

FIG. 2 illustrates a top view of the mining vehicle 100 shown in FIG. 1. FIG. 3 illustrates a side, partial cross-sectional view of the mining vehicle 100 along line A-A shown in FIG. 2. The vehicle 100 includes an onboard battery changing system 200 to allow quicker battery changing cycles and with less external equipment. The battery changing system 200 can allow a depleted battery to be set on the ground, and a charged battery to be picked up and used for continued operation. The battery changing system 200 includes a grasping assembly 302 that is moved by one or more actuation assemblies 214, which can represent hydraulic, pneumatic, electric, or other types of systems. As described below, the actuation assemblies 214 can operate to move battery lifting arms of the grasping assembly 302 to lift, lower, or otherwise move battery boxes that include one or more batteries for powering the vehicle 100.

The sub-frame assembly 104 of the vehicle 100 includes a front-mounted bucket 202 of the haulage assembly 110, a first sub-frame portion 300 (shown in FIG. 3), and an operator cab 204 having a re-enforced roof and access to the control modules which guide the movement and actions of the vehicle 100. The sub-frame assembly 106 of the vehicle 100 includes a second sub-frame portion 206 and the battery changing system 200 for supporting a battery box 208. The two sub-frames 300, 206 of the sub-frame assemblies 104, 106 are joined at a pivot point 210 by an articulation assembly 212 that allows the two sub-frames 300, 206 to work together, while allowing the vehicle 100 to "bend" around turns in otherwise tight spaces.

Figure 4:
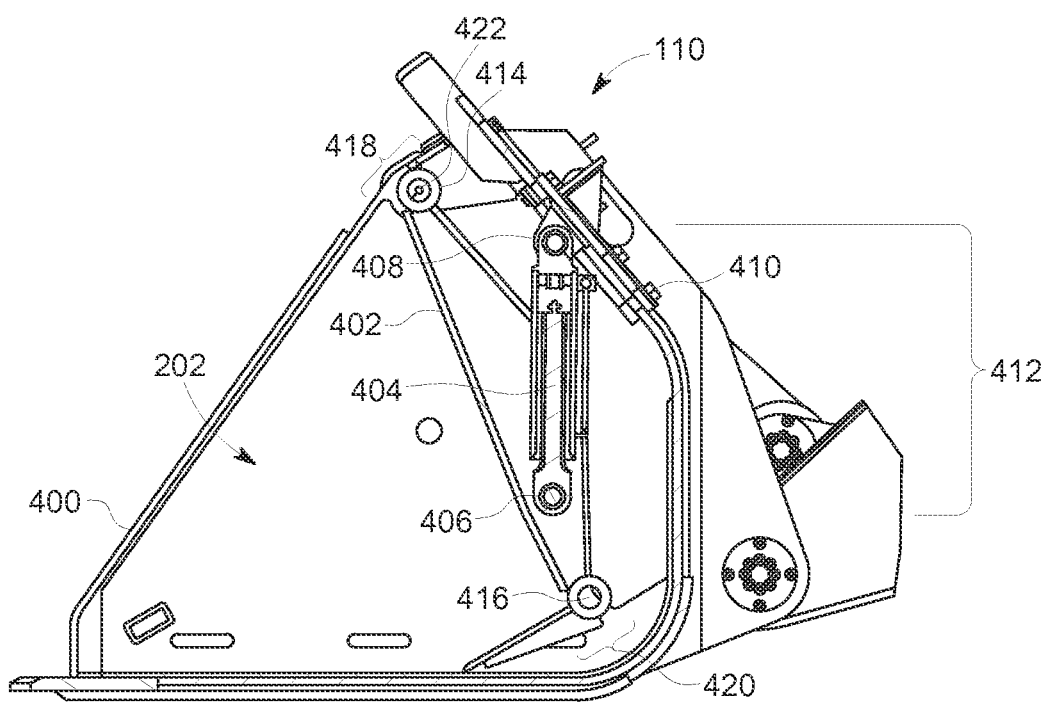
FIG. 4 illustrates a cross-sectional view of a haulage assembly shown in FIG. 1 according to one embodiment.
Figure 5:
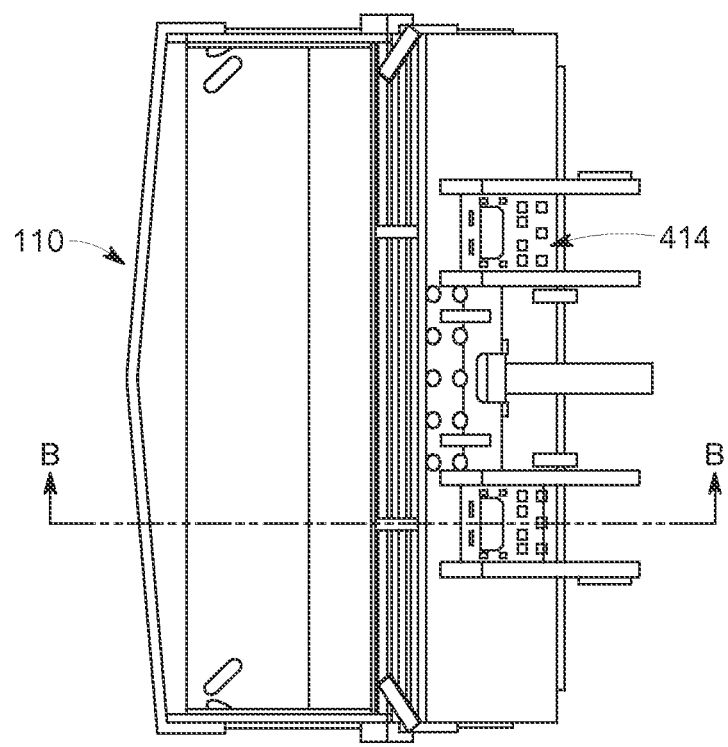
FIG. 5 illustrates a top view of the haulage assembly shown in FIG. 2.
Figure 6:
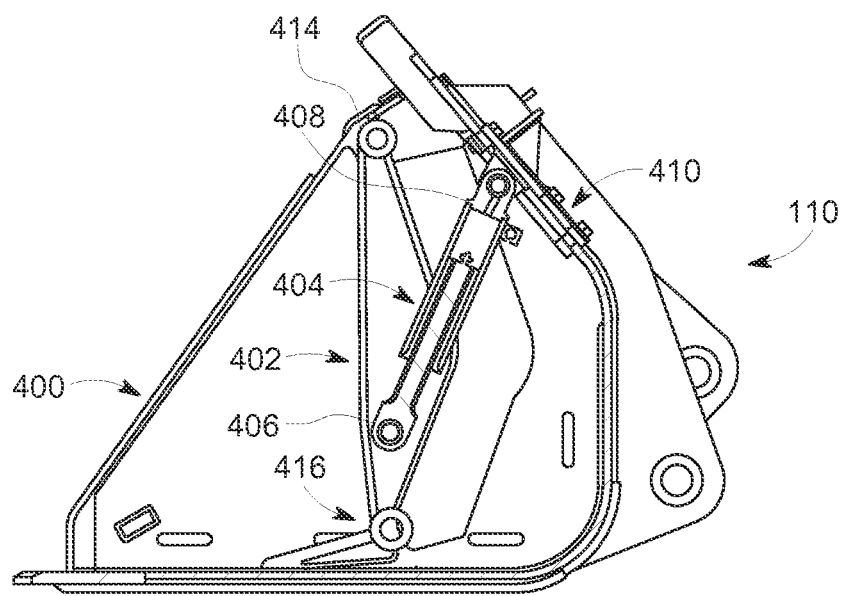
FIG. 6 illustrates a cross-sectional view of the haulage assembly along line B-B shown in FIG. 5.

FIG. 4 illustrates a cross-sectional view of the haulage assembly 110 shown in FIG. 1 according to one embodiment. FIG. 5 illustrates a top view of the haulage assembly 110 shown in FIG. 2. FIG. 6 illustrates a cross-sectional view of the haulage assembly 110 along line B-B shown in FIG. 5. The haulage assembly 110 includes a bucket weldment 400 which forms the outer portion of the bucket 202. Within the bucket 202 is an ejector blade 402 which is driven by a hydraulic cylinder 404 under control of the operator. The cylinder 404 is supported in place by a cylinder mount assembly 412 that includes a lower cylinder mount 406 and an upper cylinder mount 408. The haulage assembly 110 is secured by an external bolt 410 on the cylinder mount assembly 412. The ejector blade 402 is moved by action of the hydraulic cylinder 404, which actuates an ejector hinge 418 at an upper ejector hinge point 414 and/or an ejector hinge 420 at a lower ejector hinge point 416.

The ejector blade 402 is utilized for clearing the bucket 202. The attachment geometry of the hydraulic cylinder 404 that operates the ejector blade 402 is configured to improve operating force profile and serviceability. The cylinder 404 is oriented with an attachment point 414 near the top of a blade pivot axis 422. The geometry of this configuration allows the assembly 110 to generate more force at the beginning of a stroke of pivoting the ejector blade 402 about (e.g., around) the pivot axis 422 in order to get a bucketful of material moving out of the bucket 202 while still maintaining a low profile to increase useable space in the bucket 202. FIG. 6 illustrates the haulage assembly 110 actuating the ejector blade 402 to move material out of the bucket 202 while FIG. 4 illustrates the ejector blade 402 in a position to allow material to be received into the bucket 202. This mounting location, near the top of the bucket 202, allows the external bolt 410 to be used to make removal and service of the cylinder 404 easier.

Figure 7:
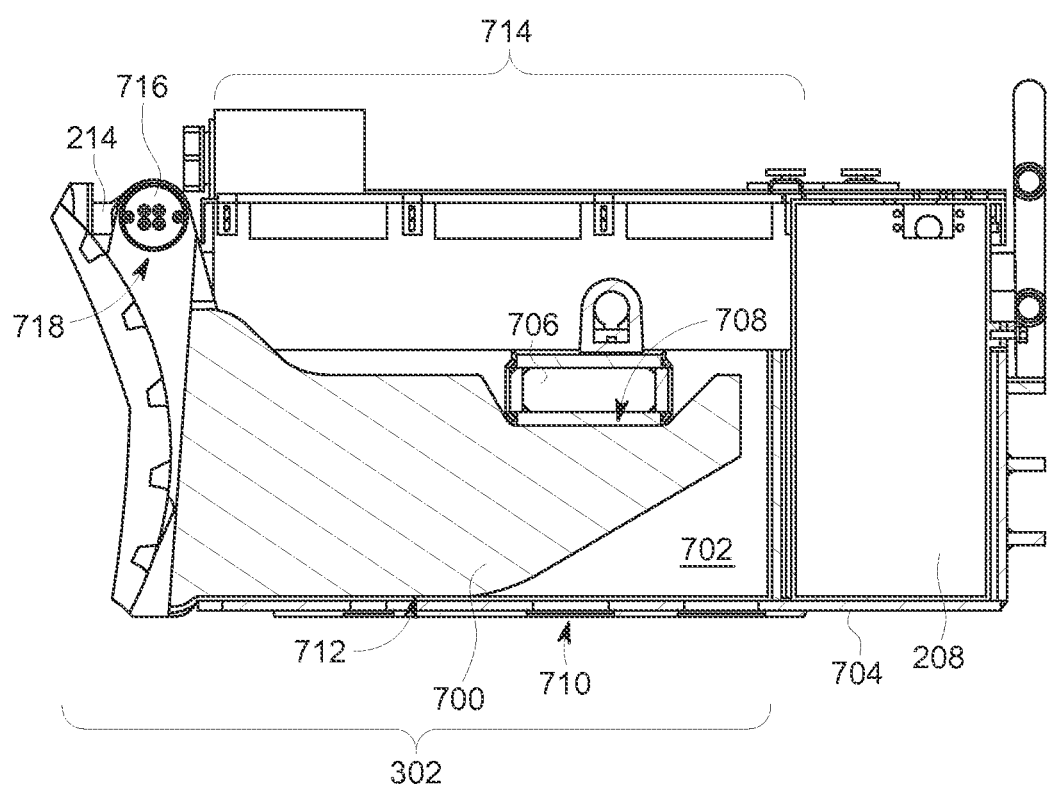
FIG. 7 illustrates a side view of a grasping assembly shown in FIG. 3 of a battery changing system shown in FIG. 2 according to one embodiment.

FIG. 7 illustrates a side view of the grasping assembly 302 of the battery changing system 200 shown in FIG. 2 according to one embodiment. The battery changing system 200 includes one or more battery lifting arms 700. The lifting arms 700 are elongated arms that are connected with the actuation assemblies 214 by a pivot coupling. In the illustrated embodiment, the pivot coupling includes a pin 716 extending through an opening 718 in the lifting arms 700. In operation, the actuation assemblies 214 can change length, such as by increasing in length, which causes the lifting arms 700 to extend away from the vehicle. During this movement of the lifting arms 700, the lifting arms 700 may pivot about the pivot coupling to slightly tilt downward toward the battery box 208. The battery box 208 includes an outer housing or tray 704 in which one or more batteries, battery cells, or the like, are located. The battery box 208 includes a base plate 710 forms a lower surface of the battery box 208. The lifting arms 700 are inserted into corresponding slots (e.g., openings) of the housing 704 of the battery box 208 such that the lifting arms 700 are received into one or more interior chambers 702 of the battery box 208.

To attain the desired ability to negotiate turns within the available mine hallway space, the battery lifting arms 700 are designed to reduce or minimize the overall footprint of the vehicle 100. The lifting arms 700 may be placed toward the middle of the housing 704 (e.g., in terms of the lateral size of the housing 704 which extends into and out of the plane of FIG. 7) to allow the battery changing system 200 to be reduced or minimized in sizes of width and/or length. To address any stability problems that might be caused by moving the lifting arms 700 to the middle, the lifting arms 700 may be longer than if the arms 700 were placed closer to the outer sides of the housing 704.

The battery box 208 includes a securing assembly 714 that is engaged by (and/or engages) the grasping assembly 302 of the battery changing system 200 to allow the battery box 208 to be lifted up to the vehicle and/or lowered from the vehicle. In the illustrated embodiment, the securing assembly 714 includes the interior chambers 702 of the battery box 208 and lifting plates 706 that are engaged by the lifting arms 700. The arms 700 are shaped so that upper surfaces 708 of the arms 700 contact the battery box 208 at the lifting plates 706. Opposite, lower surfaces 712 of the arms 700 contact the base plate 710 of the housing 704 when the battery box 208 is in a position for moving the vehicle 100 (shown in FIG. 1). These shapes allow the battery box 208 to be removed from the lifting arms 700 when the lifting arms 700 are lowered, so that the battery box 208 contacts the ground. When the battery box 208 is in a position for powering the vehicle 100, the upper and lower contact surfaces 708, 712 of the lifting arms 700 restrain movement of the battery box 208 to reduce undesirable bouncing and the associated shock loads. For example, by each of the lifting arms 700 contacting two or more surfaces of the interior chamber 702 of the housing 704 of the battery box 208, movement of the battery box 208 relative to the vehicle 100 and/or the lifting arms 700 is reduced (relative to contacting fewer surfaces).

Figure 8:
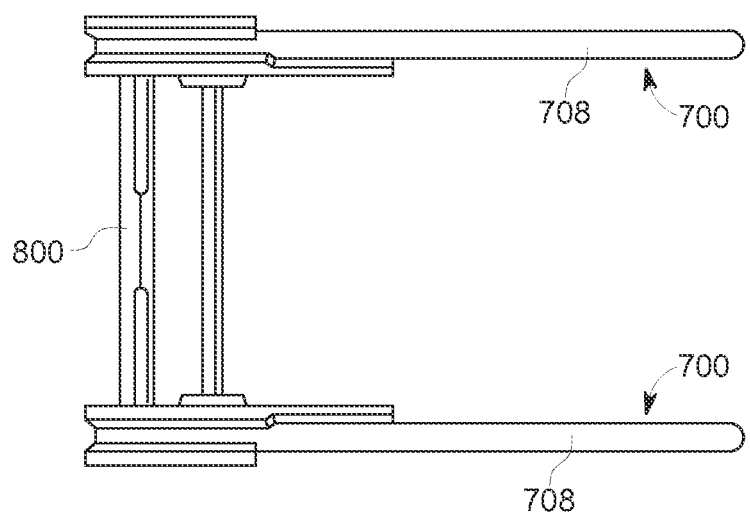
FIG. 8 illustrates a top view of lifting arms shown in FIG. 7.
Figure 9:
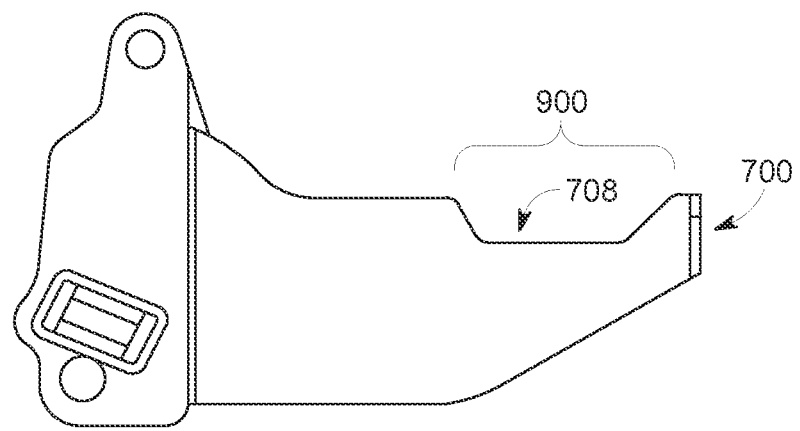
FIG. 9 illustrates a side view of the lifting arms shown in FIG. 7.

FIG. 8 illustrates a top view of the lifting arms 700 shown in FIG. 7. FIG. 9 illustrates a side view of the lifting arms 700 shown in FIG. 7. The battery changing system 200 shown in FIG. 2 can include two or more of the battery lifting arms 700, as shown in FIG. 8. The battery lifting arms 700 are connected by one or more frames 800 so that the lifting arms 700 may move to lift and/or lower the battery box 208 at the same time. Alternatively, the lifting arms 700 may be separate from each other.

As shown in FIG. 9, the lifting arms 700 have notches 900 in upper surfaces 708 of the lifting arms 700. The notches 900 form lift points that can come into contact with the lifting plates 706 (shown in FIG. 7) of the battery box 208 (shown in FIG. 2). The contact between the lifting plates 706 and the notches 900 in the arms 700 can securely support the battery box 208, together with the stabilizing positioning of the lifting arms 70 in relation to the center point of the battery box 208. Lengthening the battery lifting arms 700 can allow for the center of mass of the battery box 208 to sit inside the "lift arm envelope" (e.g., the area between the lifting arms 700), while the upper and lower surfaces 708, 712 of the lifting arms 700 can concurrently contact the lifting plates 706 and the base plate 710 to minimize or reduce motion of the battery box 208 relative to the arms 700 and/or the vehicle 100.

Figure 10:
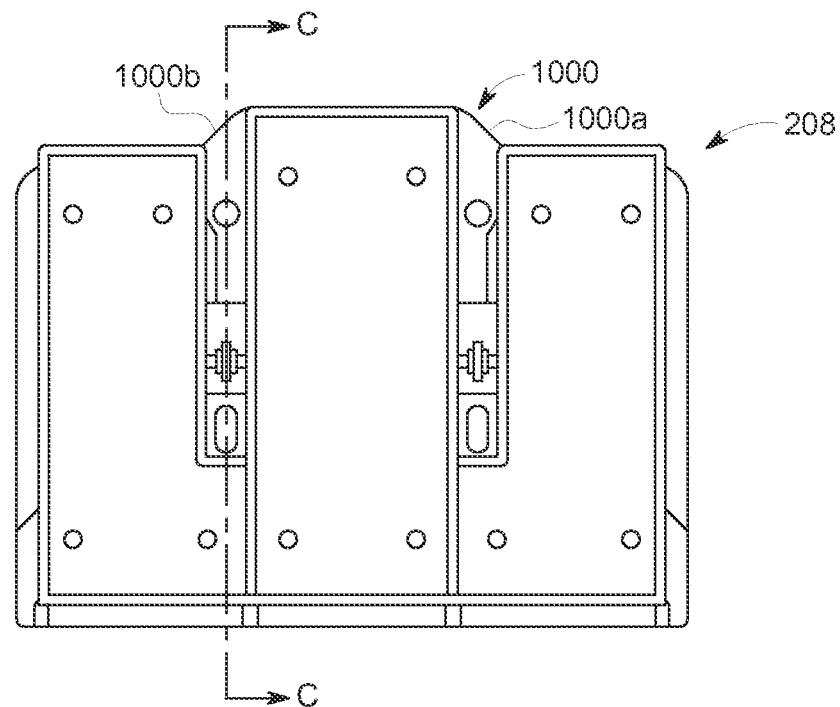
FIG. 10 illustrates a top view of a battery box shown in FIG. 2 according to one embodiment.
Figure 11:
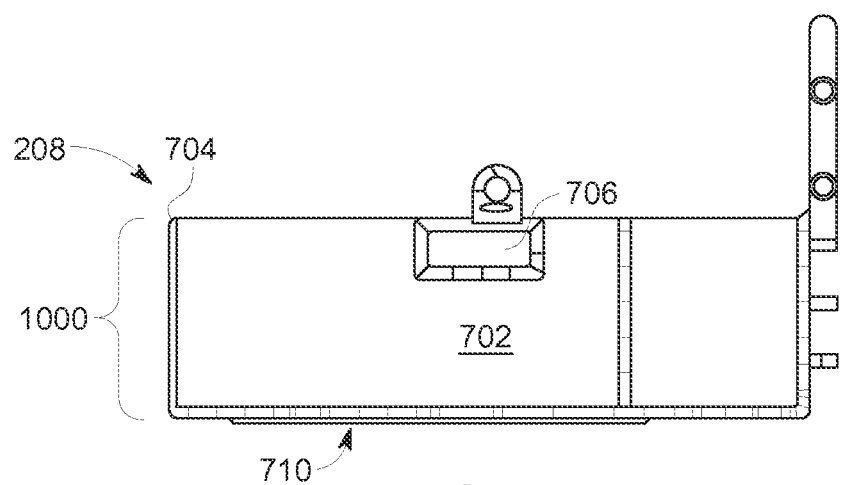
FIG. 11 illustrates a cross-sectional view of the battery box along line C-C shown in FIG. 10.

FIG. 10 illustrates a top view of the battery box 208 shown in FIG. 2 according to one embodiment. FIG. 11 illustrates a cross-sectional view of the battery box 208 along line C-C shown in FIG. 10. Slots 1000 (e.g., slots 1000A, 1000B) into the interior chamber 702 of the housing 704 of the battery box 208 are positioned to receive the lifting arms 700 (shown in FIG. 7) of the battery changing system 200 (shown in FIG. 2). In one embodiment, when the battery box 208 is sitting on the ground, the lifting arms 700 can be lowered into the interior chamber 702 of the housing 704 via the slots 1000. The arms 700 may be positioned so that the lifting plates 706 are disposed within the notches 900 (shown in FIG. 9) of the lifting arms 700. As described above, the bottom surfaces 712 (shown in FIG. 7) of the lifting arms 700 may concurrently engage a top surface of the base plate 710 of the housing 704 of the battery box 208. The housing 704 of the battery box 208 includes several inner battery tray compartments 1002 (e.g., compartments 1002A, 1002B, 1002C). These compartments 1002 may hold one or more batteries, battery cells, or the like, to provide electric current to the vehicle 100.

In operation, the vehicle 100 may be powered by the batteries in a first battery box 208. When it is necessary to replace the first battery box 208, the vehicle 100 may move to the same area (e.g., within several meters) of a charged, second battery box 208. The actuation assemblies 214 (shown in FIG. 2) of the battery changing system 200 may lower the lifting arms 700 currently engaged with the first battery box 208 until the first battery box 208 is resting on the ground. The first battery box 208 may then be electrically decoupled from the vehicle 100. For example, one or more cables that conductively couple the batteries in the first battery box 208 with the vehicle 100 may be disconnected from the vehicle 100 and/or the first battery box 208 to cut off the delivery of current from the first battery box 208 to the vehicle 100. A temporary source of electric current (e.g., another battery box, alternator or generator, or the like) may then be connected with the vehicle 100 to supply power to the vehicle 100 during the change of battery boxes 208. The vehicle 100 may then move closer to the second battery box 208 and lower the lifting arms 700 into the slots 1000 of the second battery box 208. The lifting arms 700 may be moved into engagement with the lifting plates 706 and/or the base plate 710 of the second battery box 208 by the actuation assemblies 214. The lifting arms 700 may then lift the second battery box 208 so that the second battery box 208 is no longer on the ground. At some point before, during, or after the second battery box 208 is lifted, the second battery box 208 may be connected with the vehicle 100 so that the vehicle 100 is powered by batteries in the second battery box 208. The vehicle 100 may then return to moving under power supplied by the second battery box 208. Optionally, the vehicle 100 may include multiple battery changing systems 200 such that one system 200 can change a battery to power the vehicle 100 while another system 200 lifts and carries a battery for transport to another location. For example, the vehicle 100 may include battery changing systems 200 at opposite ends of the vehicle 100.

Figure 12:
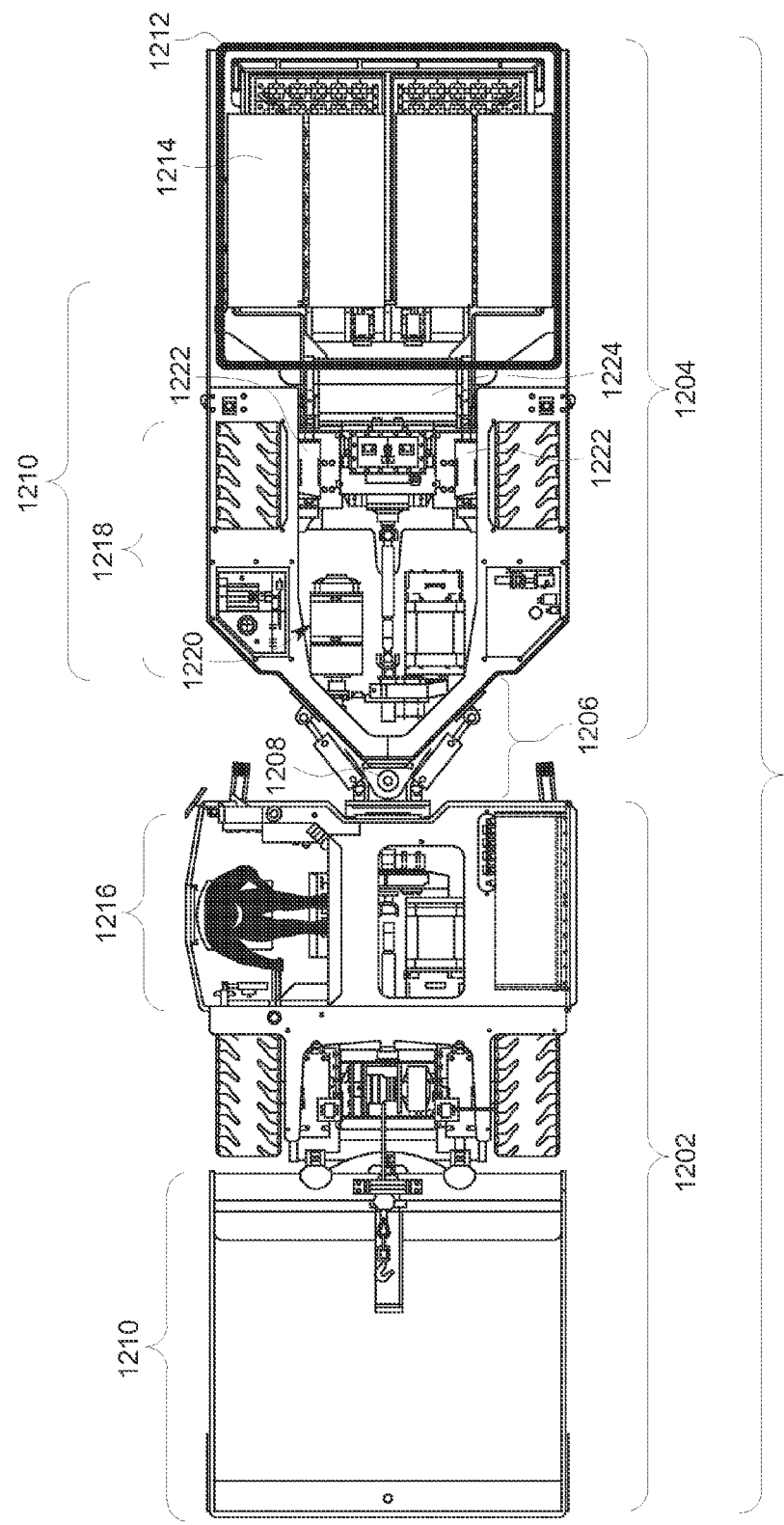
FIG. 12 illustrates a top view of a vehicle according to another embodiment.
Figure 13:
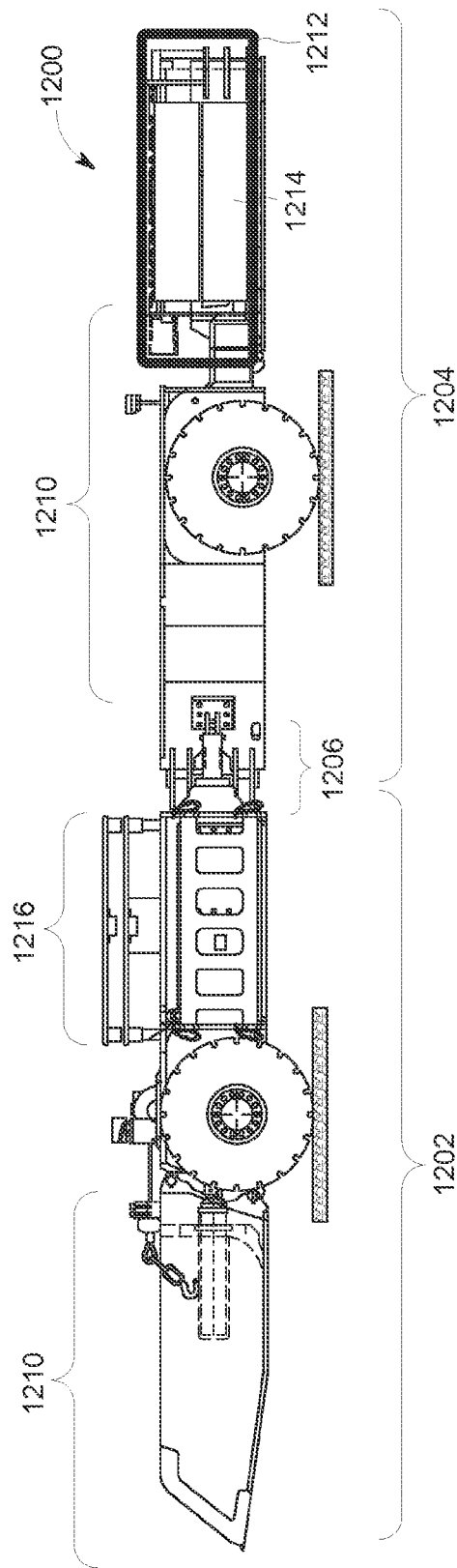
FIG. 13 illustrates a side or elevation view of the vehicle shown in FIG. 12.

FIG. 12 illustrates a top view of a vehicle 1200 according to another embodiment. FIG. 13 illustrates a side or elevation view of the vehicle 1200 shown in FIG. 12. The vehicle 1200 may represent a mining vehicle, such as a battery-powered LHD. Alternatively, the vehicle 1200 can represent another type of vehicle. The vehicle 1200 includes an articulated frame formed from plural frame assemblies. In the illustrated embodiment, the vehicle 1200 includes first and second frame assemblies 1202, 1204 coupled by a hinge assembly 1206 that allows the first and second frame assemblies 1202, 1204 to travel along different paths, such as when the vehicle 1200 travels around a corner or otherwise turns.

The frame assemblies 1202, 1204 can be formed from chassis that support other components of the vehicle 1200. The hinge assembly 1206 can include one or more components that allow the frame assemblies 1202, 1204 to pivot about (e.g., around) a pivot point 1208 of the hinge assembly 1206. These components may include, by way of example, hinges, ball and socket combinations, or the like. The frame assemblies 1202, 1204 may be similar or identical to the sub-frame assemblies described above.

The first frame assembly 1202 includes a haulage assembly 1210 that may be the same as or similar to the haulage assembly 110 (shown in FIG. 1). As described above, the vehicle 1200 may operate to lift the haulage assembly 1210 above the height of the vehicle 1200. The first frame assembly 1202 shown in FIG. 12 also includes an operator cab 1216 in which an operator may be disposed in order to manually control operations of the vehicle 1200.

The second frame assembly 1204 includes a battery changing system 1210. Similar to the battery changing system 200 (shown in FIG. 2) described above, the battery changing system 1210 can operate to grasp a battery box 1212 having one or more batteries 1214, lift the battery box 1212 from the ground or other surface, carry the battery box 1212 as the vehicle 1200 moves while being powered by the batteries 1214 in the battery box 1212 and/or while the vehicle 1200 moves the battery box 1212 to another location, and/or to lower the battery box 1212 from the vehicle 1200 during a change of batteries 1214 for the vehicle 1200.

The battery changing system 1210 includes an actuation assembly 1218 that moves one or more components of the battery changing system 1210 to raise and/or lower the battery box 1212 to and/or from the vehicle 1200. In one embodiment, the actuation assembly 1218 includes one or more extendable devices 1222. The extendable devices 1222 are powered by the vehicle 1200 to change length. For example, the extendable devices 1222 can be hydraulic cylinders that change length based on how much fluid is forced into and/or removed out of the extendable devices 1222. As another example, the extendable devices 1222 can be telescoping tubes or other parts that extend into and/or out of each other to change the length of the devices 1222.

In one aspect, the extendable devices 1222 are hydraulic cylinders powered by a motorized pump 1220, where the pump 1220 forces fluid (e.g., hydraulic fluid) into and/or out of the devices 1222 to cause the devices 1222 to move relative to the vehicle 1200. For example, the pump 1220 can force fluid into the devices 1222 to cause the devices 1222 to extend in length and move one or more grasping assemblies 1224 of the battery changing system 1210 away from the first frame assembly 1202 to grasp a battery box 1212 currently not engaged by the battery changing system 1210 (e.g., that is on the ground) or to lower a battery box 1212 that is currently engaged by the battery changing system 1210 away from the first frame assembly 1202 (e.g., to lower the battery box 1212 toward the ground). Additionally or alternatively, the pump 1220 can draw fluid from the devices 1222 to cause the devices 1222 to shorten in length and move one or more grasping assemblies 1224 of the battery changing system 1210 toward the first frame assembly 1202 to lift a battery box 1212 toward the vehicle 1200 for connecting the batteries 1214 in the battery box 1212 with the vehicle 1200.

Figure 14:
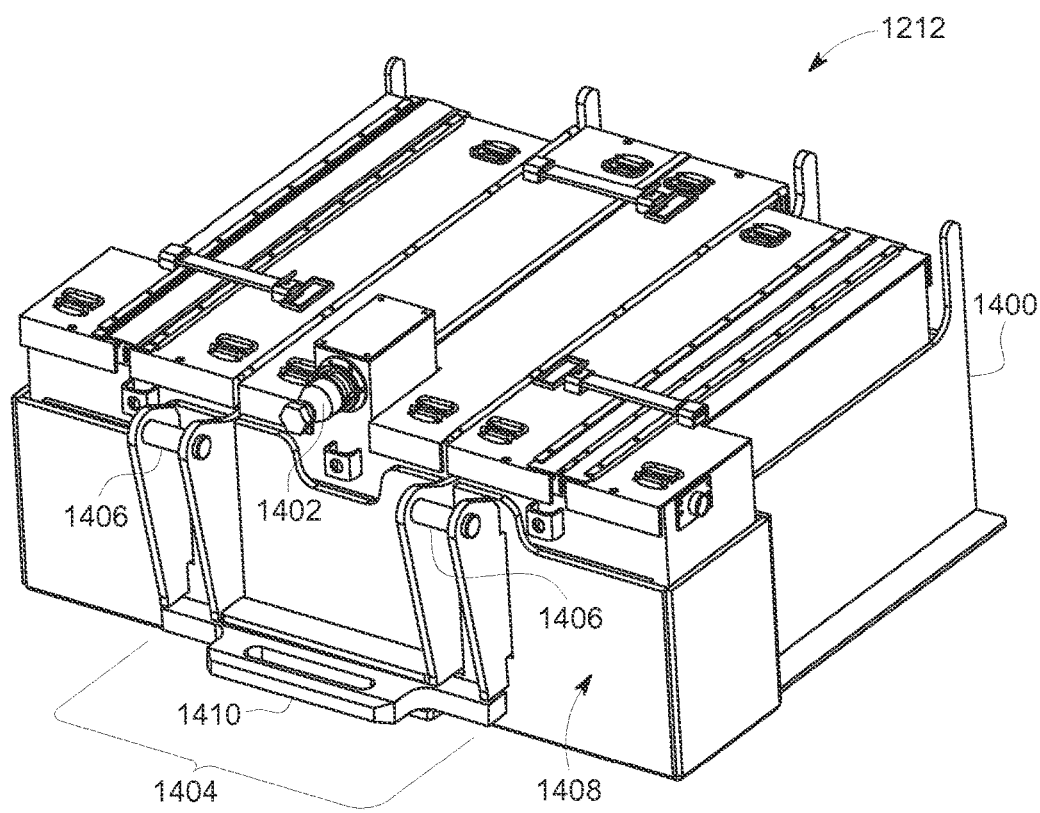
FIG. 14 illustrates a perspective view of a battery box shown in FIG. 12 according to one embodiment.

FIG. 14 illustrates a perspective view of the battery box 1212 shown in FIG. 12 according to one embodiment. The battery box 1212 includes an outer housing 1400 that defines the exterior size of the battery box 1212. One or more batteries and/or battery cells are disposed inside the housing 1400. These batteries and/or battery cells may be conductively coupled with one or more connectors 1402 that are accessible outside of the housing 1400. One or more cables or other conductors may be coupled with the connector 1402 and with an electrical system of the vehicle 1200 shown in FIG. 12 (e.g., the motors, controllers, or the like) to conduct current from the batteries and/or battery cells to the vehicle 1200 to power the vehicle 1200.

In the illustrated example, one side 1408 of the housing 1400 includes and/or is connected with a securing assembly 1404. The securing assembly 1404 includes one or more components that are engaged by the battery changing system 1210 (shown in FIG. 12) of the vehicle 1200 in order to grasp and lift the battery box 1212 from a surface into the vehicle 1200, and/or to grasp and lower the battery box 1212 from the vehicle 1200 to the surface (e.g., the ground). In the illustrated embodiment, the securing assembly 1404 includes pins 1406 that are spaced apart from the side 1408 of the housing 1400. As described below, the pins 1406 can be engaged by curved fingers of the grasping assembly 1224 (shown in FIG. 12) of the battery changing system 1210 in order for the battery changing system 1210 to lift and/or lower the battery box 1212. The securing assembly 1404 may include a protruding tongue 1410 that extends outward from the housing 1400. The tongue 1410 can be received into a receptacle gap in the battery changing system 1210 to secure the battery box 1212 to the vehicle 1200.

In contrast to the battery box 208 shown in FIG. 2, the housing 1400 of the battery box 1212 does not include slots to receive arms of a battery changing system. For example, the housing 1400 may not include openings in which part of the battery changing system 1210 is inserted to be received into the battery box 1212 so that the battery box 1212 can be lifted and/or lowered. This can allow for more interior space of the battery box 1212 to be used to hold batteries and/or battery cells relative to a battery box that dedicates part of the interior of the battery box to space where arms or other parts of a battery changing system are received.

Figure 15:
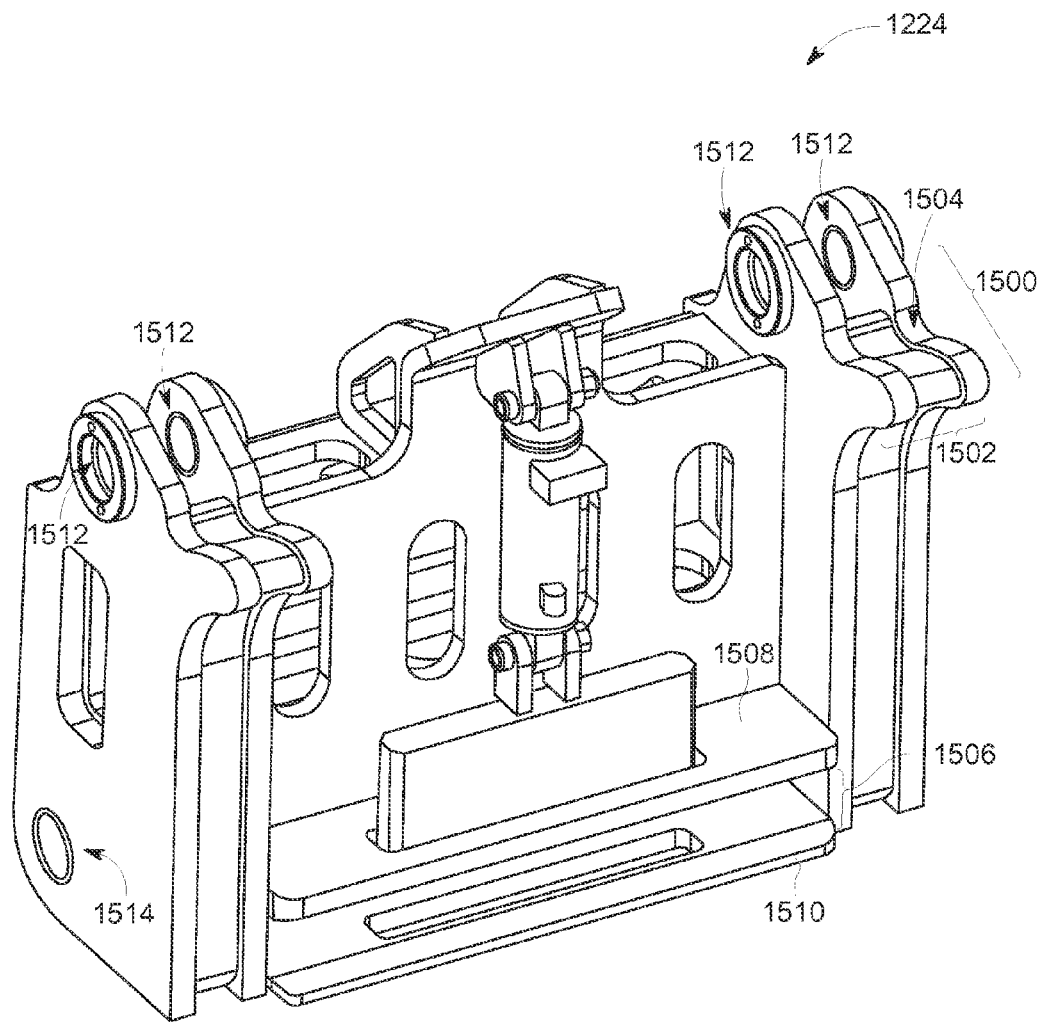
FIG. 15 illustrates a perspective view of a grasping assembly shown in FIG. 12 of the battery changing system also shown in FIG. 12 according to one embodiment.
Figure 16:
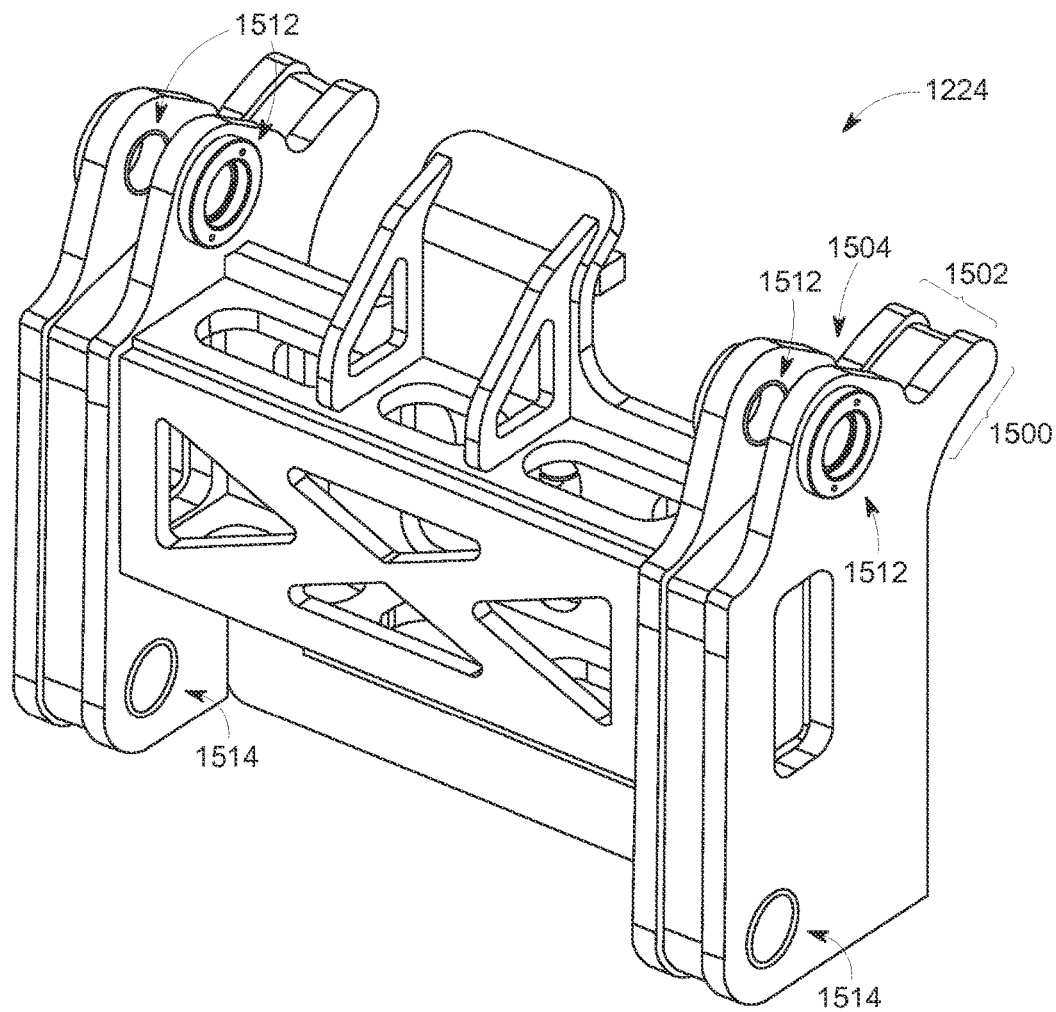
FIG. 16 illustrates another perspective view of the grasping assembly shown in FIG. 14.

FIG. 15 illustrates a perspective view of the grasping assembly 1224 shown in FIG. 12 of the battery changing system 1200 also shown in FIG. 12 according to one embodiment. FIG. 16 illustrates another perspective view of the grasping assembly 1224 shown in FIG. 14. The view of the grasping assembly 1224 shown in FIG. 15 shows a rear-facing side of the grasping assembly 1224, such as the side that faces the battery box 1212. The view of the grasping assembly 1224 in FIG. 16 shows an opposite, forward-facing side of the grasping assembly 1224, such as the side that faces away from the battery box 1212.

The grasping assembly 1224 includes one or more bodies having features that engage the securing assembly 1404 (shown in FIG. 14) of the housing 1400 (shown in FIG. 14) of the battery box 1212 (shown in FIG. 14) to grasp and/or secure the battery box 1212. In the illustrated embodiment, the grasping assembly 1224 includes engagement fingers 1500 on opposite sides of the grasping assembly 1224. Optionally, a different number of the fingers 1500 may be included and/or one or more of the fingers 1500 may be in another location.

The fingers 1500 are elongated bodies that protrude from the body of the grasping assembly 1224. The fingers 1500 extend outward toward and terminate at corresponding ends 1502. The fingers 1500 are curved (e.g., curved upward relative to a vehicle support surface) so as to form nooks 1504 along the length of the fingers 1500 between where the fingers 1500 extend from the body of the grasping assembly 1224 and the ends 1502. These nooks 1504 provide recesses that receive the pins 1406 of the battery box 1212. For example, the ends 1502 of the fingers 1500 can be inserted into the spaces between the pins 1406 of the battery box 1212 and the housing 1400 (shown in FIG. 14) of the battery box 1212. The pins 1406 of the battery box 1212 can rest or otherwise be located in the nooks 1504 of the fingers 1500. The battery changing system 1210 can lift the grasping assembly 1224 such that the fingers 1500 lift upward on the pins 1406 of the battery box 1212. Because the fingers 1500 are disposed beneath the pins 1406, this lifting motion of the fingers 1500 also lifts upward on the battery box 1212. Conversely, when the battery changing system 1210 is lowering the grasping assembly 1224, the fingers 1500 can support the pins 1406 to prevent the battery box 1212 from uncontrollably falling.

The pins 1406 can rest in the nooks 1504 of the fingers 1500 to prevent the pins 1406 from moving out of contact with the fingers 1502. For example, during lifting and/or lowering of the battery box 1212, the nooks 1504 may be portions of the fingers 1502 that are lower than other or all other portions of the fingers 1504 such that the pins 1406 remain in the nooks 1504 during movement of the battery box 1212.

The grasping assembly 1224 optionally includes a receptacle gap 1506 that is positioned to receive the tongue 1410 (shown in FIG. 14) of the battery box 1212. The gap 1506 extends between opposing plates 1508, 1510 of the grasping assembly 1224. Alternatively, the gap 1506 may represent an opening, such as a slot, in the body of the grasping assembly 1224. The gap 1506 is shaped to receive the tongue 1410 when the battery box 1212 is moved toward the grasping assembly 1224, as described below. The tongue 1410 of the battery box 1212 may remain in the gap 1506 of the grasping assembly 1224 during movement of the vehicle 1200 to assist in keeping the battery box 1212 still and/or engaged with the vehicle 1200. For example, the placement of the tongue 1410 into the gap 1506 can reduce movement of the battery box 1212 relative to the vehicle 1200.

The body of the grasping assembly 1224 also includes several pivot openings 1512, 1514. The pivot openings 1512, 1514 receive pins or other components of the battery changing system 1210 (described below) to allow for the grasping assembly 1224 to move toward the battery box 1212 while keeping the fingers 1500 aligned with the pins 1406 and the gap 1506 aligned with the tongue 1410.

Figure 17:
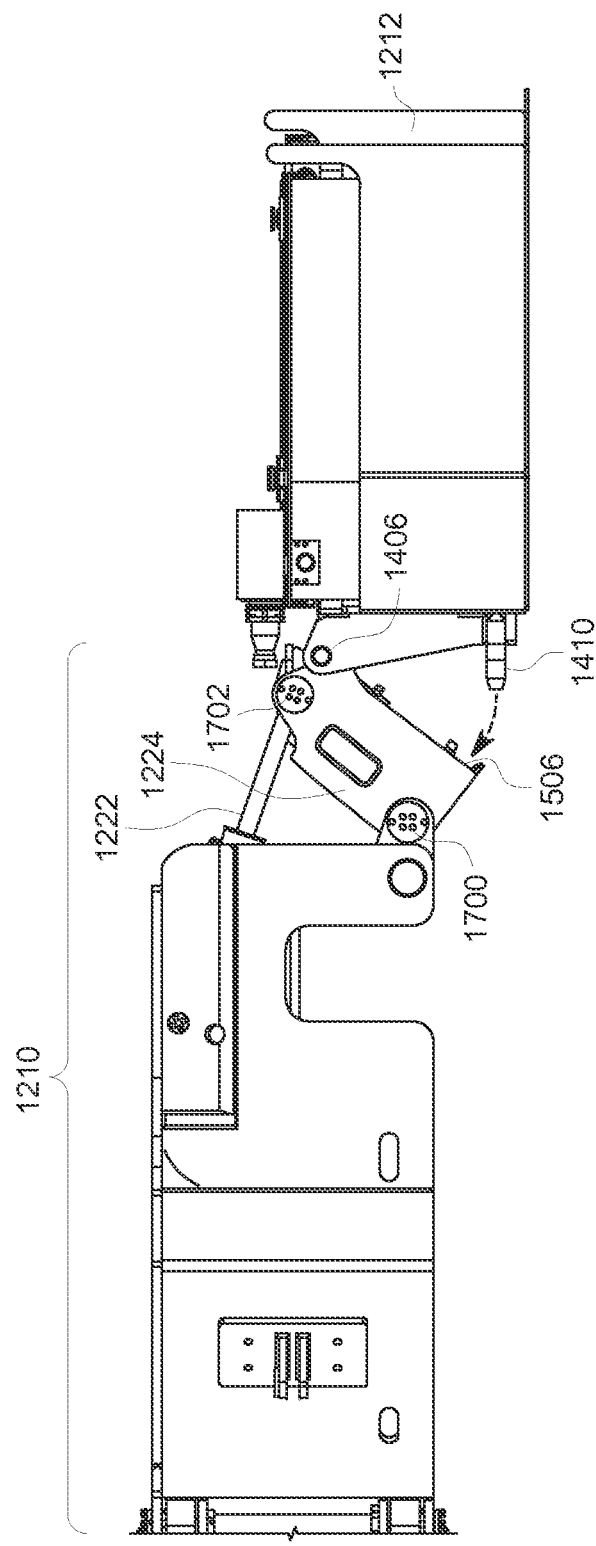
FIG. 17 illustrates a side view of the battery changing system shown in FIG. 12 in an extended position to grasp the battery box also shown in FIG. 12 according to one embodiment.
Figure 18:
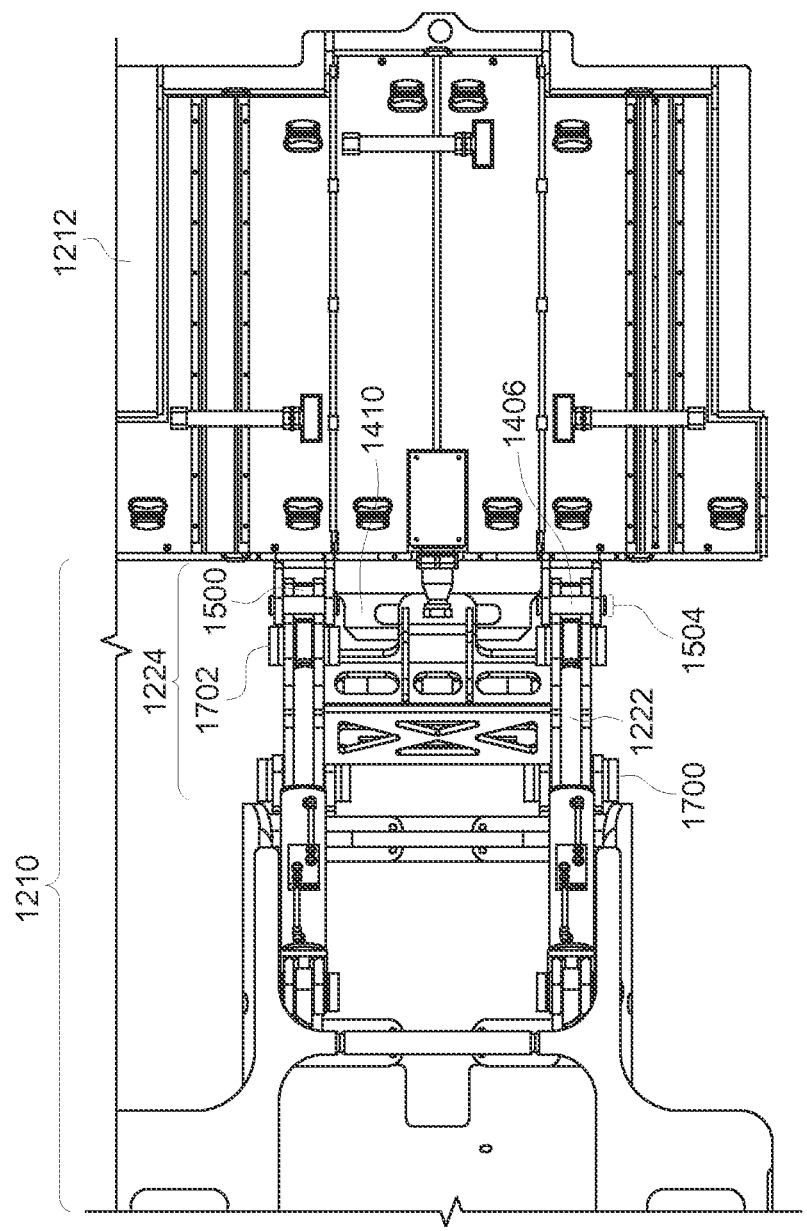
FIG. 18 illustrates a top view of the battery changing system shown in FIG. 12 in the extended position shown in FIG. 17.

FIG. 17 illustrates a side view of the battery changing system 1210 shown in FIG. 12 in an extended position to grasp the battery box 1212 also shown in FIG. 12 according to one embodiment. FIG. 18 illustrates a top view of the battery changing system 1210 shown in FIG. 12 in the extended position shown in FIG. 17. As shown in FIGS. 17 and 18, lower pins 1700 of the battery changing system 1210 may be located in or otherwise extend through the lower pivot openings 1514 (shown in FIG. 15) of the grasping assembly 1224. Upper pins 1702 of the battery changing system 1210 may be located in or otherwise extend through the upper pivot openings 1512 (shown in FIG. 15) of the grasping assembly 1224. Placement of the pins 1700, 1702 through the corresponding openings 1514, 1512 can allow for the grasping assembly 1224 to pivot about axes that are concentric with the openings 1512, 1514 relative to the vehicle 1200. For example, the lower pins 1700 extending through the lower openings 1514 can allow the grasping assembly 1224 to tilt toward the battery box 1212, as shown in FIG. 17. The coupling of the pins 1700, 1704 through the openings 1514, 1512 represent pivot couplings between the actuation assemblies 1218 and the grasping assembly 1224 that allow the grasping assembly 1224 to pivot (e.g., tilt) about the pivot couplings relative to the actuation assemblies 1218.

The devices 1222 of the battery changing system 1210 can be engaged with the upper pins 1702 of the grasping assembly 1224 or another portion of the grasping assembly 1224. The battery changing system 1210 can extend the devices 1222 to cause the grasping assembly 1224 to move away from the vehicle 1200 and toward the battery box 1212, and to pivot about the lower pins 1700, as shown in FIG. 17. This pivoting of the grasping assembly 1224 causes the grasping assembly 1224 to tilt toward the battery box 1212 such that the fingers 1500 of the grasping assembly 1224 are lowered (e.g., relative to the vehicle 1200) toward the pins 1406 of the battery box 1212. The fingers 1500 may lower to or below the pins 1406 of the battery box 1212.

The devices 1222 may then at least partially retract to pull back the grasping assembly 1224 toward the vehicle 1200. This retraction can cause the grasping assembly 1224 to pivot about the lower pins 1700 in the opposite direction and tilt back toward the vehicle 1200. This tilting can cause the fingers 1500 to engage the pins 1406 of the battery box 1212. If the pins 1406 are not aligned with the nooks 1504 of the fingers 1500, then the curved shape of the fingers 1500 can cause the pins 1406 to slide along the fingers 1500 downward toward the nooks 1504 as the devices 1222 continue to retract and pull the grasping assembly 1224 back toward the vehicle 1200.

In the illustrated embodiment, the tongue 1410 of the battery box 1212 moves into the gap 1506 of the grasping assembly 1224 as the battery changing system 1210 pulls back on the grasping assembly 1224. The gap 1506 can be positioned so that, as the grasping assembly 1224 pivots toward the vehicle 1200 during retraction of the devices 1222, the battery box 1212 may be lifted off the surface on which the battery box 1212 was disposed. The battery box 1212 may tilt slightly so that the tongue 1410 is aligned with the gap 1506. Continued pulling of the grasping assembly 1224 back toward the vehicle 1200 can cause the battery box 1212 to be pulled (e.g., by the fingers 1500) toward the grasping assembly 1224 such that the tongue 1410 is received into the gap 1506.

Figure 19:
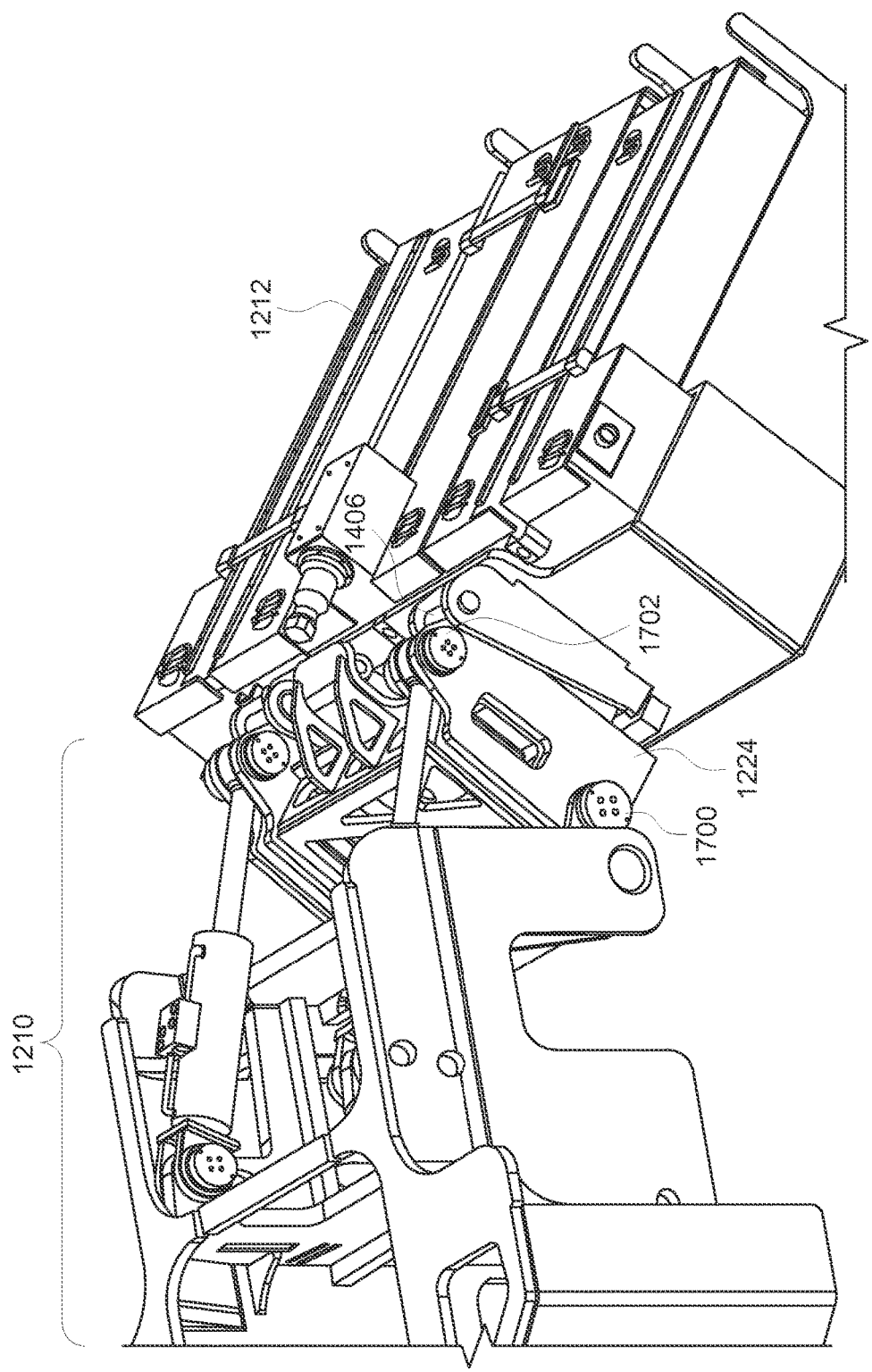
FIG. 19 illustrates a perspective view of the battery changing system shown in FIG. 12 in an intermediate position to lift the battery box also shown in FIG. 12 toward the vehicle according to one embodiment.
Figure 20:
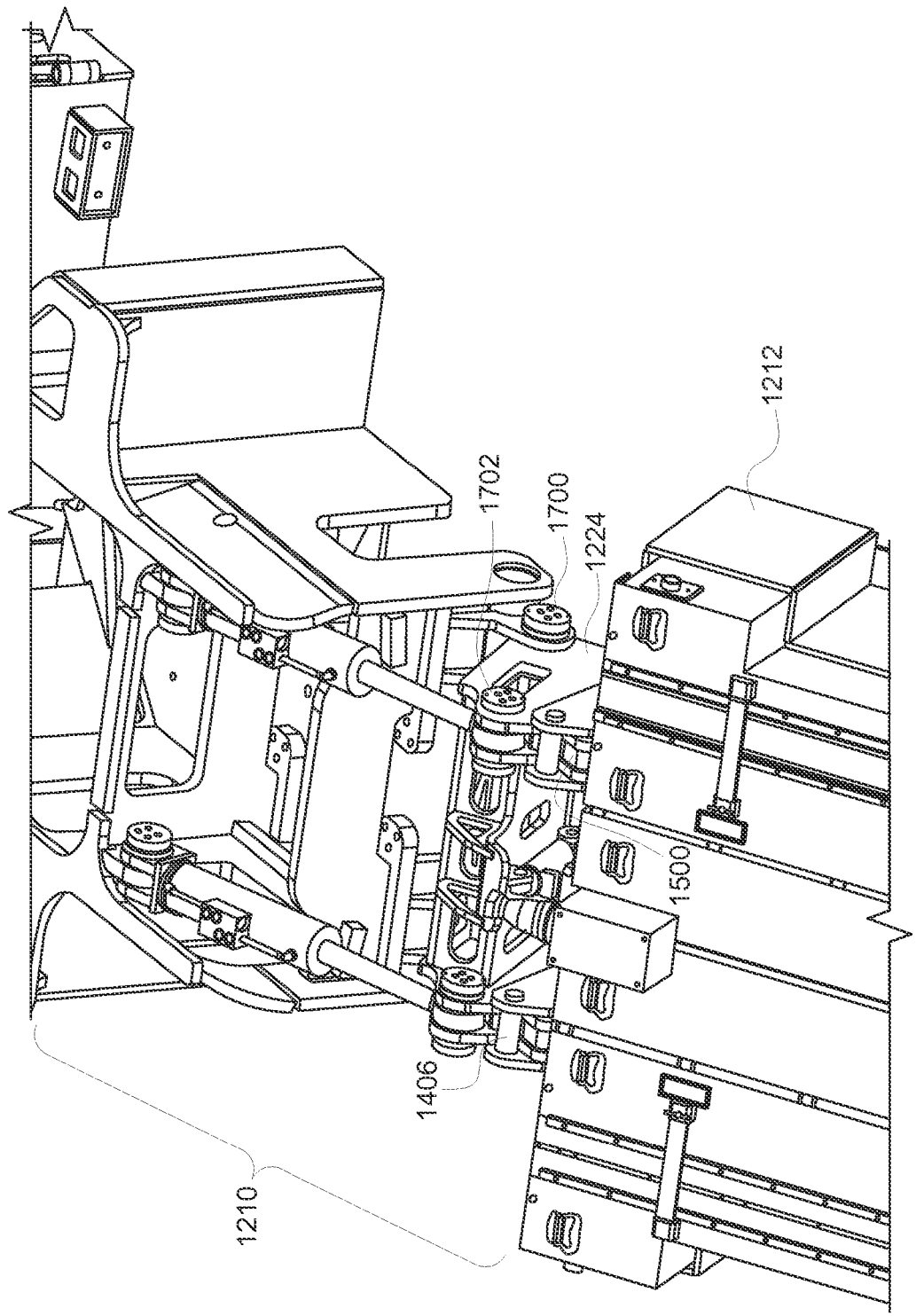
FIG. 20 illustrates another perspective view of the battery changing system in the intermediate position shown in FIG. 19.

FIG. 19 illustrates a perspective view of the battery changing system 1210 shown in FIG. 12 in an intermediate position to lift the battery box 1212 also shown in FIG. 12 toward the vehicle 1200 according to one embodiment. FIG. 20 illustrates another perspective view of the battery changing system 1210 in the intermediate position shown in FIG. 19. During lifting or lowering of the battery box 1212, the fingers 1500 of the grasping assembly 1224 can support the pins 1406 of the battery box 1212. During lifting or lowering of the battery box 1212, the tilting of the grasping assembly 1224 also can cause tilting of the battery box 1212, as shown in FIGS. 19 and 20. Also as shown in FIGS. 19 and 20, the tongue 1410 (shown in FIG. 14) of the battery box 1212 can be received into the gap 1506 (shown in FIG. 15) of the grasping assembly 1224 when the battery box 1212 is sufficiently close to the grasping assembly 1224.

During lifting of the battery box 1212 up to the vehicle 1200 (e.g., for powering the vehicle 1200 and/or transport to another location), the battery changing system 1210 can extend the grasping assembly 1224 from the vehicle 1200 to the position shown in FIGS. 17 and 18 to grasp the battery box 1212. The battery changing system 1210 can then retract the grasping assembly 1224 back toward the vehicle 1200, which pulls and lifts the battery box 1212 from the surface on which the battery box 1212 was sitting. The pivoting of the grasping assembly 1224 about the pins 1700, 1702 can cause the battery box 1212 to be lifted to the position shown in FIGS. 19 and 20. Continued pulling of the grasping assembly 1224 toward the vehicle 1200 by the battery changing system 1210 can lift the battery box 1212 up off the surface on which the battery box 1212 was resting, and up onto the vehicle 1200. The battery box 1212 may be moved into the position shown in FIG. 1 for being electrically coupled with the vehicle 1200 and/or for being transported by the vehicle 1200 to another location.

During lowering of the battery box 1212 (e.g., for replacing the battery box 1212 and/or for placing the battery box 1212 for another machine), the battery changing system 1210 can extend the grasping assembly 1224 from the vehicle 1200 to the position shown in FIGS. 19 and 20 to lower the battery box 1212 from the vehicle 1200. The battery changing system 1210 can continue to extend the grasping assembly 1224 from the vehicle 1200, which tilts the battery box 1212 such that the tongue 1410 of the battery box 1212 exits the gap 1506 of the grasping assembly 1224. This extension of the grasping assembly 1224 lowers the battery box 1212 to a surface on which the vehicle 1200 is located (or another surface). The battery changing system 1210 can lower the grasping assembly 1224 after the battery box 1212 is resting on the surface to allow the fingers 1500 of the grasping assembly 1224 to disengage from the pins 1406 of the battery box 1212. The vehicle 1200 may then move away from the battery box 1212 so that the grasping assembly 1224 can be pulled back to the vehicle 1200 by the battery changing system 1210.

Figure 21:
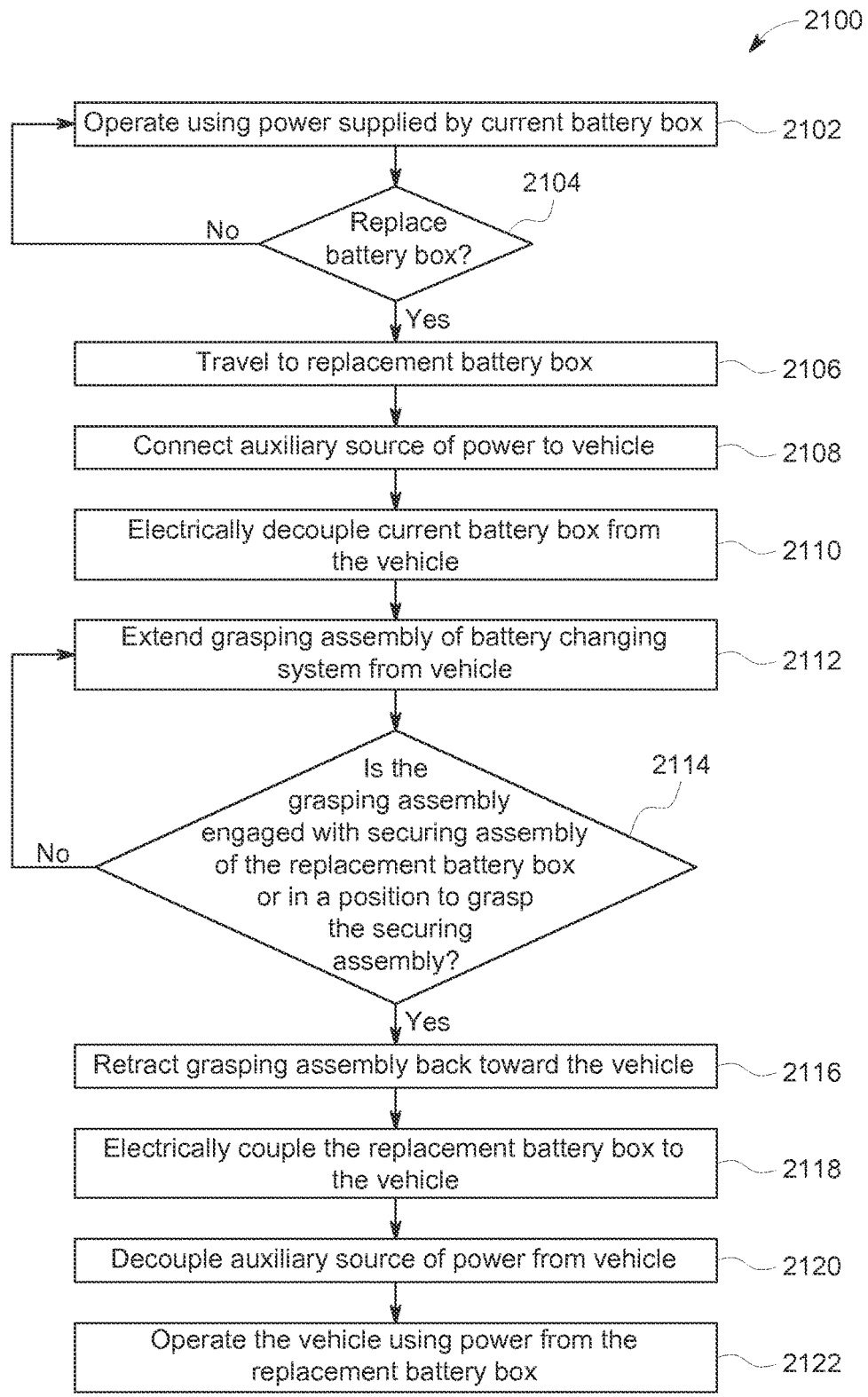
FIG. 21 illustrates a flowchart for a method of replacing a battery box of a vehicle according to one embodiment.

FIG. 21 illustrates a flowchart for a method 2100 of replacing a battery box of a vehicle according to one embodiment. The method 2100 may be used to replace the battery box of a vehicle shown and described herein. Alternatively, the method 2100 may be used to transport the battery box between locations using a vehicle. At 2102, the vehicle operates using electric power supplied from a battery box currently coupled with the vehicle. At 2104, a determination is made as to whether the battery box needs to be replaced with a replacement battery box. For example, the remaining electric energy stored in the battery box may be at or approaching a limit designated for replacing the battery box.

If the battery box is to be replaced, then flow of the method 2100 can continue to 2106. Alternatively, if the battery box is not to be replaced, then flow of the method 2100 can return to 2102 so that the vehicle can continue operating using power supplied by the current battery box.

At 2106, the vehicle travels to the location of a replacement battery box. At 2108, an auxiliary source of electric power for the vehicle is coupled with the vehicle. For example, another battery box, generator, alternator, utility power, or the like, may be electrically coupled with the vehicle. This auxiliary source can power the vehicle during replacement of the current battery box.

At 2110, the current battery box is decoupled from the vehicle. For example, the cable or other conductor that connects the current battery box with the vehicle may be disconnected from the battery box and/or from the vehicle. At 2112, a grasping assembly of a battery changing system of the vehicle is extended from the vehicle. The grasping assembly may extend outward from the vehicle to lower the current battery box to the ground. For example, the extendable devices can lengthen to cause the grasping assembly to move away from the vehicle and lower toward the ground or other surface. The grasping assembly can be lowered a sufficient amount that the current battery box is placed onto the ground or other surface and the grasping assembly disengages from the battery box. For example, the grasping assembly may be lowered after the battery box is on the ground so that the fingers disengage from the pins of the battery box, so that the lifting arms disengage from the lifting plates, or the like.

The vehicle may then move to the replacement battery box so that the grasping assembly can engage the replacement battery box. For example, with respect to the battery changing system 200 shown in FIG. 2, the lifting arms 700 may extend away from the vehicle and be lowered toward the battery box 208. With respect to the battery changing system 1210 shown in FIG. 12, the grasping assembly 1224 may extend away from and tilt toward the battery box 1212. The grasping assemblies 1224 can lower a sufficient amount such that the fingers 1500 are disposed below or in contact with the pins 1406 of the battery box 1406.

At 2114, a determination is made as to whether the grasping assembly is engaged with a securing assembly of the battery box or is in a position to grasp the securing assembly of the battery box. With respect to the lifting arms 700 of the grasping assembly 302 shown in FIG. 7, this determination may involve determining if the lifting arms 700 are disposed in the interior chambers 702 of the battery box 208, if the lifting plates 706 of the battery box 208 are engaged with the lifting arms 700, and/or if the lifting plates 706 are below, but not engaged with, the lifting plates 706. With respect to the grasping assembly 1224 shown in FIG. 12, this determination may involve determining if the fingers 1500 of the grasping assembly 1224 are engaged with the pins 1406 of the battery box 1212 and/or if the fingers 1500 are below, but not engaged with, the pins 1406 of the battery box 1212.

If the grasping assembly is engaged with the securing assembly of the battery box or is in a position to engage the securing assembly, then flow of the method 2100 may continue to 2116. But, if the grasping assembly is not yet engaged with the securing assembly or is not yet in a position to engage the securing assembly, then flow of the method 2100 can return to 2112. For example, the grasping assembly can continue to be extended from the battery changing system toward the battery box until the grasping assembly engages or is in a position to engage the securing assembly of the battery box.

At 2116, the grasping assembly is retracted back toward the vehicle. For example, if the lifting arms 700 are inside the interior chambers 702 of the battery box 208 such that the lifting arms 700 are engaged with or below the lifting plates 706 of the battery box 208, then the grasping assembly can be retracted. This retraction can involve lifting the lifting arms 700 such that the battery box 208 is lifted from within up toward the vehicle. The lifting arms 700 can lift and pull the battery box 208 back to the vehicle to a position shown in FIGS. 1 through 3. As another example, if the fingers 1500 of the grasping assembly 1224 are engaged with or below the pins 1406 of the battery box 1212, then the grasping assembly 1224 can be retracted to cause the fingers 1500 to engage and lift up on the pins 1406. As described above, the retracting of the grasping assembly 1224 can cause the battery box 1212 to be tilted and lifted up off the ground to the vehicle, such as in the position shown in FIGS. 1, 12, and 13.

At 2118, the replacement battery box is electrically coupled with the vehicle. For example, one or more cables or other conductors may be connected with the batteries in the replacement battery box and with the vehicle. At 2120, the auxiliary source of power may be decoupled from the vehicle. For example, the cable or other conductor that connected the auxiliary source with the vehicle may be disconnected from the source and/or vehicle. At 2122, the vehicle is operated using power supplied by the replacement battery box. In one aspect, flow of the method 2100 can return to 2102 so that this replacement battery box may be replaced with one or more other battery boxes when needed. Alternatively, the grasping assemblies may be extended to engage, lift, and move the battery boxes without the battery boxes supplying power to the vehicle. For example, the vehicle may lift and move battery boxes for other machines or vehicles.

The battery changing systems described herein can allow for batteries of vehicles such as LHDs to be changed quickly and without requiring separate lifting equipment to lift the battery boxes to the vehicles. This permits less machine downtime and additional equipment investment and maintenance needed for a separate battery hoisting rig. It also allows for easier advancing into the mine because no separate lifting equipment needs to be moved.

Some of the other onboard battery lift systems used on other vehicles require too much space to allow a battery-powered LHD to operate effectively in the enclosed space of an underground mine. In addition to allowing the machine to more easily work in the available space, the battery changing systems described herein can reduce unwanted battery movement, which will increase battery life through reduced shock loading.

The ejector blade cylinder geometry described above can allow for both easier maintenance and reduced cylinder size. Ease of maintenance is improved because the cylinder mount can be unbolted from the top, with the bucket on the ground and removed without disconnecting the hoses or lifting the ejector blade outside the normal travel. With this geometry, the cylinder size, associated hydraulic oil flow and pump size is decreased due to a more advantageous force profile.

In one embodiment, a system (e.g., a battery changing system) includes a grasping assembly and an actuation assembly. The grasping assembly is configured to be disposed onboard a vehicle and to engage a battery box having one or more batteries disposed therein. The actuation assembly is configured to move the grasping assembly away from the vehicle toward the battery box. The actuation assembly also is configured to move the grasping assembly into engagement with a securing assembly of the battery box. The actuation assembly is configured to move the grasping assembly back toward the vehicle while the grasping assembly engages the securing assembly of the battery box to lift the battery box onto the vehicle.

In one aspect, the vehicle on which the grasping assembly is configured to be disposed onboard is a load-haul-dump (LHD) mining vehicle. The actuation assembly can be configured to lift the battery box off a surface and onto the LHD mining vehicle to power the LHD mining vehicle using the one or more batteries of the battery box.

In one aspect, the securing assembly of the battery box comprises one or more lifting plates disposed in a housing of the battery box. The grasping assembly can include one or more lifting arms shaped to engage the one or more lifting plates disposed inside the housing to engage the battery box.

In one aspect, the grasping assembly includes one or more fingers that protrude from a body of the grasping assembly and shaped to engage one or more pins of the battery box to engage the battery box.

In one aspect, the one or more fingers are curved upward and include one or more nooks shaped to receive the one or more pins of the battery box during lifting of the battery box.

In one aspect, the grasping assembly includes a receiving gap shaped and positioned to receive a protruding tongue of the battery box during lifting of the battery box.

In one aspect, the actuation assembly includes an extendable device configured to change in length (e.g., the extendable device is controllable to change in length). The extendable device can be configured to increase in length to extend the grasping assembly to the battery box. The extendable device can be configured to decrease in length to cause the grasping assembly to engage and lift the battery box to the vehicle.

In one aspect, the grasping assembly is coupled to the actuation assembly at one or more pivot couplings configured to cause the grasping assembly to tilt relative to the vehicle and the battery box during one or more of lowering of the grasping assembly toward the battery box or lifting of the grasping assembly and the battery box toward the vehicle.

In another embodiment, a system (e.g., a battery changing system) includes one or more extendable devices and a grasping assembly. The one or more extendable devices are configured to be disposed onboard a vehicle and to change length. The grasping assembly is configured to be disposed onboard the vehicle and to be coupled with the one or more extendable devices. The grasping assembly includes one or more protrusions configured to engage a battery box disposed off-board of the vehicle. The one or more extendable devices are configured to increase in length to extend the grasping assembly away from the vehicle and to lower the grasping assembly below at least a portion of the battery box. The one or more extendable devices also can be configured to decrease in length to cause the one or more protrusions of the grasping assembly to engage the battery box, to lift the battery box, and to move the battery box onboard the vehicle.

In one aspect, the one or more extendable devices include hydraulic cylinders.

In one aspect, the one or more protrusions of the grasping assembly include one or more upwardly curved fingers.

In one aspect, the grasping assembly includes a receiving gap configured to receive a protruding tongue of the battery box during lifting of the battery box to the vehicle.

In one aspect, the one or more protrusions of the grasping assembly include one or more lifting arms configured to extend into one or more interior chambers of the battery box to engage the battery box.

In one aspect, the grasping assembly is configured to be coupled with the one or more extendable devices by one or more pivot couplings. The grasping assembly can be configured to pivot about the one or more pivot couplings during lengthening of the one or more extendable devices to cause the grasping assembly to tilt downward toward the battery box.

In one aspect, the grasping assembly is configured to be coupled with the one or more extendable devices by one or more pivot couplings. The grasping assembly can be configured to pivot about the one or more pivot couplings during shortening of the one or more extendable devices to cause the grasping assembly to tilt upward toward the vehicle.

In one embodiment, a vehicle (e.g., a mining vehicle) includes a vehicle frame, a haulage assembly, and a battery changing system. The vehicle frame includes at least first and second sub-frame assemblies connected with each other. For example, the first and second sub-frame assemblies may be movably connected with each other via a pivot, hinge, or other articulating joint. The haulage assembly (e.g., bucket assembly, scoop assembly, shield hauler assembly, or the like) can be coupled with the first sub-frame assembly and configured to pick up and transport mined material or other material. The battery changing system can be coupled with the second sub-frame assembly and configured to extend from the vehicle frame and lower to a battery box comprising one or more batteries disposed off-board the vehicle frame. The battery changing system also can be configured to grasp the battery box and lift the battery box onto the vehicle frame.

In one aspect, the vehicle frame is an articulated frame having the at least first and second sub-frame assemblies coupled with each other by a hinge assembly.

In one aspect, the battery changing system includes a grasping assembly having one or more protrusions configured to engage the battery box during lifting of the battery box onto the vehicle frame.

In one aspect, the one or more protrusions of the grasping assembly include one or more upwardly curved fingers configured to engage the battery box at one or more locations disposed outside of the battery box.

In one aspect, the one or more protrusions of the grasping assembly include one or more lifting arms configured to engage the battery box at one or more locations inside the battery box.

In another embodiment, a vehicle (e.g., a mining vehicle) includes a vehicle frame, two wheel-axle pairs (each respectively comprising an axle and two wheels), a haulage assembly, and a battery changing system. The vehicle frame includes at least first and second sub-frame assemblies connected with each other. For example, the first and second sub-frame assemblies may be movably connected with each other via a pivot, hinge, or other articulating joint. A first of the wheel-axle pairs is operably coupled to the first sub-frame assembly, and a second of the wheel-axle pairs is operably coupled to the second sub-frame assembly. The haulage assembly (e.g., bucket assembly, scoop assembly, shield hauler assembly, or the like) is coupled with the first sub-frame assembly and configured to pick up and transport material. The haulage assembly defines a front of the vehicle, whereas the second sub-frame assembly defines a rear of the vehicle. The battery changing system is coupled with the second sub-frame assembly and configured to extend from the vehicle frame and lower to a battery box comprising one or more batteries disposed off-board the vehicle frame. The battery changing system also can be configured to grasp the battery box and lift the battery box onto the second sub-frame assembly. The battery changing system is positioned on the second sub-frame assembly such that when the battery box is lifted by the battery changing system onto the second sub-frame assembly, the battery box is positioned to the rear of the second wheel-axle pair that is operably coupled to the second sub-frame assembly.

In any of the embodiments herein, the battery box may be sized (in terms of electrical storage capacity) to store sufficient electrical energy to power one or more traction motors of a vehicle to move the vehicle along a route. The vehicle may be a relatively large, multi-ton (e.g., 10 to 50 tons) vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A system comprising:
a grasping assembly configured to be disposed onboard a vehicle and to engage a securing assembly that protrudes outward from a single, common, planar first side of an outer housing of a battery box having one or more batteries disposed therein, the outer housing having the first side that faces the grasping assembly and that is a closest portion of the outer housing to the grasping assembly, the outer housing also including a second side that is opposite of the first side; and
an actuation assembly configured to move the grasping assembly away from the vehicle toward the battery box, the actuation assembly configured to move the grasping assembly into engagement with the securing assembly of the battery box without the grasping assembly extending into an interior of the outer housing of the battery box between the opposite first and second sides of the outer housing, without the grasping assembly engaging a side of the battery box other than the securing assembly on the first side, and without the grasping assembly extending beyond the first side of the housing of the battery box toward the opposite second side of the housing of the battery box, wherein the actuation assembly is configured to move the grasping assembly back toward the vehicle while the grasping assembly engages the securing assembly of the battery box to lift the battery box onto the vehicle.

2. The system of claim 1, wherein the vehicle on which the grasping assembly is configured to be disposed onboard is a load-haul-dump (LHD) mining vehicle, and wherein the actuation assembly is configured to lift the battery box off a surface and onto the LHD mining vehicle to power the LHD mining vehicle using the one or more batteries of the battery box.

3. The system of claim 1, wherein the grasping assembly includes one or more fingers that protrude from a body of the grasping assembly and shaped to engage one or more pins of the securing assembly of the battery box that are outside of the first and second sides of the outer housing of the battery box to engage the battery box.

4. The system of claim 3, wherein the one or more fingers are curved upward and include one or more nooks shaped to receive the one or more pins of the battery box during lifting of the battery box.

5. The system of claim 1, wherein the grasping assembly includes a receiving gap shaped and positioned to receive a protruding tongue of the securing assembly of the battery box outside of the first and second sides of the outer housing of the battery box during lifting of the battery box.

6. The system of claim 1, wherein the actuation assembly includes an extendable device configured to change in length, the extendable device configured to increase in length to extend the grasping assembly to the battery box, the extendable device configured to decrease in length to cause the grasping assembly to engage and lift the battery box to the vehicle.

7. The system of claim 6, wherein the grasping assembly is coupled to the actuation assembly at one or more pivot couplings configured to cause the grasping assembly to tilt relative to the vehicle and the battery box during one or more of lowering of the grasping assembly toward the battery box or lifting of the grasping assembly and the battery box toward the vehicle.

8. The system of claim 1, wherein the grasping assembly is configured to grasp multiple, different components of the securing assembly that are all disposed on the first side of the outer housing that faces the vehicle frame to lift the battery box.

9. A system comprising:
one or more extendable devices configured to be disposed onboard a vehicle and to change length; and
a grasping assembly configured to be disposed onboard the vehicle and to be coupled with the one or more extendable devices, the grasping assembly including one or more protrusions configured to engage a securing assembly that protrudes outward from a planar first side of an outer housing of a battery box that is disposed off-board of the vehicle and that includes one or more batteries disposed therein, the outer housing including the first side that faces the grasping assembly and that is a closest portion of the outer housing to the grasping assembly, the outer housing also including a second side that is opposite of the first side,
wherein the one or more extendable devices are configured to increase in length to extend the grasping assembly away from the vehicle and to lower the grasping assembly below at least a portion of the battery box, the one or more extendable devices also configured to decrease in length to cause the one or more protrusions of the grasping assembly to engage the battery box, to lift the battery box, and to move the battery box onboard the vehicle without the grasping assembly extending into the outer housing of the battery box between the opposite first and second sides of the outer housing, without the grasping assembly engaging a side of the battery box other than the first side, and without the grasping assembly extending beyond the first side of the housing toward the opposite second side of the housing.

10. The system of claim 9, wherein the one or more extendable devices include hydraulic cylinders.

11. The system of claim 9, wherein the one or more protrusions of the grasping assembly include one or more upwardly curved fingers.

12. The system of claim 9, wherein the grasping assembly includes a receiving gap configured to receive a protruding tongue of the securing assembly of the battery box outside of the first and second sides of the outer housing of the battery box during lifting of the battery box to the vehicle.

13. The system of claim 9, wherein the grasping assembly is configured to be coupled with the one or more extendable devices by one or more pivot couplings, the grasping assembly configured to pivot about the one or more pivot couplings during lengthening of the one or more extendable devices to cause the grasping assembly to tilt downward toward the battery box.

14. The system of claim 9, wherein the grasping assembly is configured to be coupled with the one or more extendable devices by one or more pivot couplings, the grasping assembly configured to pivot about the one or more pivot couplings during shortening of the one or more extendable devices to cause the grasping assembly to tilt upward toward the vehicle.

15. The system of claim 9, wherein the grasping assembly is configured to grasp multiple, different components of the securing assembly that are all disposed on the first side of the outer housing that faces the vehicle frame to lift the battery box.

16. A vehicle comprising:
a vehicle frame comprising at least first and second sub-frame assemblies connected with each other;
a haulage assembly coupled with the first sub-frame assembly, the haulage assembly configured to pick up and transport material; and
a battery changing system coupled with the second sub-frame assembly, the battery changing system configured to extend from the vehicle frame and lower to a battery box comprising one or more batteries disposed off-board the vehicle frame, the battery changing system configured to grasp a securing assembly disposed outside of and on a single planar first side of an outer housing of the battery box that faces the vehicle frame and lift the battery box onto the vehicle frame without grasping another side of the outer housing and without extending beyond the first side of the outer housing toward an opposite second side of the outer housing, the first side of the outer housing being a closest portion of the outer housing to the vehicle frame.

17. The vehicle of claim 16, wherein the vehicle frame is an articulated frame having the at least first and second sub-frame assemblies coupled with each other by a hinge assembly.

18. The vehicle of claim 16, wherein the battery changing system includes a grasping assembly having one or more protrusions configured to engage the battery box outside of the first and second sides of the outer housing during lifting of the battery box onto the vehicle frame.

19. The vehicle of claim 18, wherein the one or more protrusions of the grasping assembly include one or more upwardly curved fingers configured to engage the battery box outside of the first and second sides of the outer housing.

20. The vehicle of claim 16, wherein the battery changing system is configured to grasp multiple, different components of the securing assembly that are all disposed on the single first side of the outer housing that faces the vehicle frame to lift the battery box.

* * * * *